(12) United States Patent
McIntosh

(10) Patent No.: US 12,458,000 B2
(45) Date of Patent: Nov. 4, 2025

(54) SYSTEM, METHOD, AND APPARATUS FOR ACTIVE PEST DENIAL, APIARY MONITORING AND MANAGEMENT

(71) Applicant: Gordon David McIntosh, Austin, TX (US)

(72) Inventor: Gordon David McIntosh, Austin, TX (US)

( * ) Notice: Subject to any disclaimer, the term of this patent is extended or adjusted under 35 U.S.C. 154(b) by 170 days.

(21) Appl. No.: 18/203,667

(22) Filed: May 31, 2023

(65) Prior Publication Data

US 2024/0008458 A1  Jan. 11, 2024

Related U.S. Application Data

(60) Provisional application No. 63/367,645, filed on Jul. 5, 2022.

(51) Int. Cl.
*A01K 47/06* (2006.01)
*A01M 1/02* (2006.01)
*A01M 1/22* (2006.01)

(52) U.S. Cl.
CPC ............ *A01K 47/06* (2013.01); *A01M 1/026* (2013.01); *A01M 1/22* (2013.01); *A01M 2200/012* (2013.01)

(58) Field of Classification Search
CPC ...... A01K 47/06; A01K 47/00; A01K 67/033; A01K 1/0017; A01K 1/0023; A01K 1/08; A01K 31/02; A01K 29/00; A01K 29/005; A01K 61/90; A01K 61/95; A01H 1/027; A01M 1/026; A01M 1/22

USPC .............................................................. 449/3
See application file for complete search history.

(56) References Cited

U.S. PATENT DOCUMENTS

| | | | | |
|---|---|---|---|---|
| 3,200,419 | A * | 8/1965 | Root ..................... | A01K 47/06 449/2 |
| 9,585,376 | B2 * | 3/2017 | Park ..................... | A01N 61/00 |
| 10,375,947 | B2 * | 8/2019 | Liu ...................... | G06V 10/145 |
| 11,036,981 | B1 * | 6/2021 | Liao ..................... | A01K 47/06 |
| 11,612,145 | B1 * | 3/2023 | Davidi ................. | G06N 20/20 449/6 |
| 2005/0025357 | A1 * | 2/2005 | Landwehr ........... | A01M 3/005 382/224 |
| 2007/0144056 | A1 * | 6/2007 | Gleason, Jr. ........ | A01M 1/026 43/107 |
| 2015/0123801 | A1 * | 5/2015 | de Leon .............. | A01K 47/06 340/573.3 |

(Continued)

FOREIGN PATENT DOCUMENTS

| | | | | |
|---|---|---|---|---|
| DE | 202014102372 U1 * | 7/2014 | ........... | A01K 47/06 |
| EP | 3868202 A1 * | 8/2021 | ........... | A01K 29/00 |

(Continued)

*Primary Examiner* — Zoe Tam Tran

(57) ABSTRACT

Aspects of this disclosure include a system, method and apparatus providing automated audio and vision based pest detection and entry denial for a beehive. The apparatus may include multiple video classification sensors that transmit a signal of the dorsal and lateral aspect of the insects to a computer running a video processing algorithms that classify all insects attempting to enter a beehive. Additionally, the apparatus may include multiple audio classification sensors that transmit audio signals to the computer for audio analysis to assist in classification. Insects classified as pests (not-a-bee) are actively excluded from the beehive.

23 Claims, 35 Drawing Sheets

(56) References Cited

U.S. PATENT DOCUMENTS

| | | | | |
|---|---|---|---|---|
| 2017/0079249 | A1* | 3/2017 | Chapa | G01J 1/42 |
| 2017/0360010 | A1* | 12/2017 | Wilson-Rich | H04Q 9/02 |
| 2018/0084772 | A1* | 3/2018 | Peeters | A01M 1/026 |
| 2018/0121764 | A1* | 5/2018 | Zha | G06V 10/255 |
| 2020/0267945 | A1* | 8/2020 | Symes | A01K 47/06 |
| 2021/0329889 | A1* | 10/2021 | Lepek | A61D 1/06 |
| 2021/0400925 | A1* | 12/2021 | Harvey | A01K 47/06 |
| 2022/0104474 | A1* | 4/2022 | Chellappan | H04R 1/08 |
| 2022/0125029 | A1* | 4/2022 | Chapa | A01N 1/0221 |

FOREIGN PATENT DOCUMENTS

| | | | | |
|---|---|---|---|---|
| KR | 20190127028 A | * | 11/2019 | |
| WO | WO-2017034146 A1 | * | 3/2017 | A01M 1/04 |

* cited by examiner

SYSTEM, METHOD, AND APPARATUS FOR ACTIVE PEST DENIAL, APIARY MONITORING AND MANAGEMENT

CROSS-REFERENCE TO RELATED APPLICATIONS

The present application claims priority to U.S. Provisional Application No. 63/367,645, filed Jul. 5, 2022, the disclosures of which are incorporated by reference herein in their entirety

TECHNICAL FIELD

The present invention pertains to an enhanced method for controlling pests that pose a threat to bee colonies in both commercial and non-commercial apiaries, specifically focusing on preventing pest entry into the beehive. Furthermore, the present invention offers a comprehensive system, method, and apparatus designed to actively repel and eliminate pests attempting to infiltrate a beehive, while also providing valuable monitoring and management tools for apiary upkeep and optimization.

BACKGROUND OF THE INVENTION

In many countries honey bees are raised commercially in apiaries for both honey production and pollination services with a combined market value around US$9 billion in 2021. Additionally, in the U.S., honey bees contribute nearly US$20 billion to the value of crop production. This contribution, made by managed honey bees, comes in the form of increased yields and superior quality crops for growers and consumers. In order to sustain these apiaries, proper bee and pest management is required, with special measures taken to protect the bees from pests.

Honey bees raised commercially comprise two species, *Apis cerana*, the eastern honey bee or the Asiatic honey bee, and *Apis mellifera*, the western honey bee, or European honey bee. Non-commercial honey bees comprise an additional six species, *Apis florea, Apis andreniformis, Apis dorsata, Apis laboriosa, Apis koshevnicovi*, and *Apis nigrocincta*. Non-commercial honey bees and non-honey producing bees include some 20,000 known species.

*Apis cerana* is a species of honey bee native to southern, southeastern, and eastern Asia with relatively small colonies, typically only around 6,000 to 7,000 workers. This bee species is found at altitudes from sea level up to 3,500 meters in areas with appropriate flora and climate and has adapted to adverse climatic conditions and can survive extreme fluctuations in temperature and long periods of rainfall. It is unique in its ability to survive temperatures as low as −0.1° C., a temperature lethal for other bee species.

*Apis mellifera* is the most common species of honey bees worldwide, occurring naturally in Europe, the Middle East, and Africa with colonies of up to 50,000 individuals. This species has been subdivided into at least 20 recognized subspecies (or races), none of which are native to the Americas however, subspecies have been spread extensively beyond their natural range due to economic benefits related to pollination and honey production. Presently, European honey bees are naturalized on all continents except *Antarctica* and the primary honey bee in America.

In order to sustain apiaries, pest management is required, including special measures to protect from wasps, beetles, mites, wax moths, and any diseases they may carry. Additional pests include Braula fly, spiders, earwigs, ants, cockroaches, non-commercial honey bees, non-honey producing bees, and mice.

Wasps are a narrow-waisted insect that include hornets and yellowjackets. A hornet is an insect in the genus *Vespa* and is the largest of the eusocial wasps, and are similar in appearance to yellowjackets. A yellowjacket is a descriptive term used in North America for two genera of social wasps, *Vespula* and *Dolichovespula*, which are black with yellow markings on the front of the head and yellow banding around the abdomen.

Wasps are an enemy of honey bees and will hover around the entrance of a honey beehive and try to overwhelm the worker bees guarding the beehive. If the honey bee colony is weak, the wasp will enter the beehive and eat the honey and pollen as well as the honey bee workers and larva.

The Asian giant hornet (*Vespa mandarinia*) is of particular interest in areas where it has been introduced as an invasive species because the indigenous honey bees have no natural defenses. This pest is very large with a body length up to 45 mm, strong mandibles and is intensely predatory and hunts medium- to large-sized insects, such as bees, This hornet often attacks honey beehives to obtain the adults, pupae, and larvae as food for their own larvae. The hornets can devastate a colony of honey bees, a single hornet can kill as many as 40 bees per minute due to its large mandibles, which can quickly strike and decapitate prey. The honey bees' stings are ineffective because the hornets are five times their size and heavily armored. Only a few hornets (under 50) can exterminate a colony of tens of thousands of bees in a few hours. Typically, individual guard bees leave the beehive and attack the hornets in the air away from the nest.

If allowed, the giant hornets will slaughter the colony until only a few bees remain, then enter the honey beehive and predate the pupae and larvae, as well as the bees they had previously killed. During this phase, the hornets make continual trips from the occupied hive to their nest for several days to up to two weeks as they devour the honey bee brood.

Research indicates bees under attack frequently emit auditory responses when predators were directly outside of nests, in part because of frenetic production of anti-predator pipes, which share acoustic traits with alarm shrieks, fear screams and panic calls of primates, birds and meerkats.

The small hive beetle (*Aethina tumida*) is a beekeeping pest endemic to sub-Saharan Africa but has spread to many other locations, including North America, Australia, and the Philippines. The adult beetle is dark brown to black, about 5-6 mm long×3 mm in width. It can be a destructive pest of honey bee colonies, causing damage to comb, stored honey, and pollen. If a beetle infestation is sufficiently heavy, they may cause bees to abandon their hive. Its presence can also be a marker in the diagnosis of colony collapse disorder for honey bees. The beetles can also be a pest of stored combs, and honey (in the comb) awaiting extraction. Beetle larvae may tunnel through combs of honey, feeding and defecating, causing discoloration and fermentation of the honey.

Similar to the small hive beetle is the large hive beetle, (*Oplostomus fuligineus*), which is around 20-23 mm long with a shining black body. It is also an insect pest of honey bees that is native to regions of Africa. Another closely related species, *Oplostomus haroldi* has also been observed as a pest of honey bees in honey bee colonies in regions of Africa.

Mites are small arachnids, usually less than 1 mm in length, with a simple, unsegmented body. Of particular interest to beehive protection are *Tropilaelaps* mites and *Varroa* mites.

*Tropilaelaps* mites are native to Asia and naturally parasitise the brood of the Giant honey bees of Asia, such as *Apis dorsata*. Two species of *Tropilaelaps* mites (*Tropilaelaps clareae* and *T. mercedesae*) are also able to parasitise European honey bees (*Apis mellifera*). *Tropilaelaps* mites are external parasitic mites that feed on the haemolymph (blood) of drone and worker bee pupae, as well as reproduce on honey bee brood.

*Tropilaelaps* mite infestation causes severe damage to honey bee colonies such as deformed pupae and adults (stunting, damaged wings/legs/abdomens), parasitic mite syndrome (PMS) and colony decline. The colony may also swarm or abscond, further spreading the mite to new locations. *Tropilaelaps* mites can also spread viruses which further affect the colony's health and disease susceptibility. If *Tropilaelaps* mites were to become established in Australia, they would cause significant losses to managed and wild honey bee colonies, crop pollination and yields of honey products.

*Varroa* mites are also external parasitic mites and require a honey bee host to survive and reproduce. The *Varroa* mite is only able to reproduce on honey bee brood, while only adult female *Varroa* mites are able to feed on adult honey bees. Therefore, the entire life cycle of *Varroa* mite occurs within the honey bee colony. Mites initially adhere to the honey bee body surface while outside the beehive, once attached the mite sucks blood, and when returned to the beehive, breeding is carried out. The female mite lays eggs in pupae cells, and the hatched mite grows by sucking the body fluid of the honey bee pupae. Once the mite egg matures, it moves to a new pupae cell and repeats breeding. Bees that have inhaled body fluids will fail to grow, become smaller, fail to operate normally, and in severe cases may result in the annihilation of the bees in the beehive.

Deformed wing virus (DWV) is a worldwide disease that is often associated with high *Varroa* mite populations. Like mosquitoes, *Varroa* mites serve as a vector for a whole host of viral diseases, including DWV, a part of a complex of closely related virus strains/species that also includes Kakugo virus, *V. destructor* virus 1 and Egypt bee virus. *Varroa* mites, carrying these diseases inside them, then infect other bees within the colony as well as honey bees in other colonies due to robbing and drift.

Mites are controlled primarily by chemical control methods, for example by the use of organic acids such as formic acid. In order not to endanger the honey harvest, this treatment is usually carried out in August or September and thus after the honey harvest. If mite infestation is so strong at an earlier stage that it requires formic acid control, this usually means that it is no longer possible to harvest the honey. In addition, treatment of bees with chemical control methods can lead to the loss of bees, possibly even to the loss of the queen bee.

The greater and lessor wax moths are also pests of concern. The adult greater wax moth is gray color about 13-19 mm long with some mottling on its wings with the back third of the wing is bronze colored. The lesser wax moth has similar coloration but is only 10-13 mm long. When the wings of the moth are folded over the body they appear as a 'roof' or 'boat' shape. In both species the male moths are smaller than female moths and lighter in color. Male moths can also be distinguished by the indentation at the front of the wing, while this region is straight in females. Both species eat beeswax, particularly unprocessed wax, pollen, remains of larval honey bees, and honey bee cocoon silk.

Adult Braula flies are small (0.9 mm wide by 1.5 mm long), wingless flies which can be seen riding on the thorax or abdomen of adult honey bees. It is red-brown colored, covered in hairs and has six legs, which look large in relation to its body size. Braula fly lay small white eggs (0.84 mm by 0.42 mm) throughout the beehive, however, only the eggs deposited on capped honey comb will hatch. Adult Braula flies can be seen on workers, drones and queens, but have a recognized preference for queen bees. In some cases queens can carry a large number of Braula fly, each of which steals a small amount of food from the queen. If enough Braula flies are present this can cause the queen to lay fewer eggs and possibly cause her supersedure.

Beehives provide shelter to a number of large and small arthropods such as spiders, earwigs, and cockroaches. These are not harmful to the bees or hive equipment and do not require control.

Ants are usually not serious pests in honey beehives, however, some honeybee species are more vulnerable and serious damage may be caused. Ants may enter hives to search for food or establish nesting sites and are typically found between the inner and outer covers of the beehive and in pollen traps.

Mice are a serious pest of stored combs and may inhabit hives with active honey bee colonies during the fall and winter months. These rodents chew combs and frames to make room for building their nests. Mice urinate on combs and frames, making bees reluctant to use the combs or clean out these nests in the spring.

Management of pests attempting to enter areas where they may cause damage may employ different methods, including electrocution, however, research has shown that when insects are electrocuted, it can spread a mist containing insect parts up to about 2 meters. This can contaminate the immediate vicinity with bacteria and viruses that can settle on food items.

U.S. beekeepers lost over 45% of their managed honey bee colonies from April 2020 to April 2021, according to preliminary results of an annual nationwide survey. A major cause cited was honey bee pests, in particular the *Varroa destructor* mite.

Because most pest control measures are reactionary, finding damage already done and attempting to rid infected hives of the pest, it would represent a major innovation if proactive measures could detect and prevent these pests from entering hives. Additionally, the timely detection of invasive species is critical to control of pests across regions, however, the current labor intensive inspection practices in commercial apiaries renders this impractical. Therefore, it would be advantageous to have an improved system, method and apparatus to identify, monitor and prevent pest entry into beehives.

SUMMARY OF THE INVENTION

The present invention introduces a comprehensive system, method, and apparatus designed to identify and actively prevent pests from entering a beehive. Entry denial is achieved through the use of mechanisms that deter or eliminate pests attempting to infiltrate the hive.

In the preferred embodiment of the invention, visual and audio classification sensors gather real-time data and categorize all insects trying to access the beehive. The system employs one or more visual classification sensors to monitor a top-down view of the entrance, while audio classification sensors capture ambient sounds.

For user convenience, the visual and audio classification sensors are mounted on an apparatus that attaches to an existing hive (brood) box. This apparatus is positioned in front of the current hive entrance, limiting access to individual entry points monitored by the video classification sensor(s). Each entry point features an automated kill mechanism, activated by the classification and control computer, to prevent pest entry.

Visual classification sensors can include visible light cameras, infrared cameras, LIDAR, laser scanners, other suitable technologies, or a combination thereof. Audio classification sensors encompass one or more microphones or other appropriate technologies that convert sound into electrical signals for analysis, enabling the differentiation of honey bees from flying pests such as wasps and hornets.

Data collected from the classification sensors is processed by a classification and control computer, which utilizes specialized classification algorithms, including traditional and artificial intelligence (AI) algorithms. These AI algorithms may leverage trained neural networks to accurately identify insects in real-time. Additional factors, such as insect size, sound, shape, speed, coloration, and direction of movement, can be used to enhance classification performance.

The classification process categorizes every insect as either "a bee" or "a pest," with "a bee" referring to *Apis cerana*, *Apis mellifera* or other desirable honeybee. Upon initialization, the beekeeper declares either *Apis cerana*, *Apis mellifera* or another desirable honeybee species as the preferred beehive species, and all other bee species are deemed pests, warranting exclusion from the beehive. The classification and control computer algorithms will then only identify the declared beehive species as "a bee."

When initially activated, the classification and control computer uses the specified species to select the inference data set previously generated using a library of images and audio files representative of that species for positive training of its neural network. The inference data set selected also contains data (for negative response) trained using a library of images and audio files (if available) of pests, including wasps, beetles, mites, wax moths, *Braula* flies, spiders, earwigs, ants, cockroaches, and mite-infested bees. Additionally, audio files of bees under normal conditions and audio files of bees under stress (attack) may be used for both positive and negative neural network training and subsequent inference.

Insects classified as "a bee" are counted and logged as either entering or exiting the beehive. Insects designated as "a pest" trigger an exclusion attempt, employing a mechanism that kills or severely injures the insect. Furthermore, all "a pest" classified insects are identified by type, logged, and their statistics are made available to the beekeeper via a secure, remote communication link. Beekeepers can also set limit conditions for each insect type, which, when reached, trigger a notification message to be transmitted to the beekeeper. For example, a beekeeper may set a very low threshold for detecting an Asian giant hornet (or other previously unseen invasive species) so that local authorities can be notified.

In various embodiments, the visual and audio classification sensors can be enhanced by incorporating multiple lateral/ventral (side/bottom) view sensors. Additional audio classification sensors may also be integrated to improve classification. Moreover, ultrasonic transducers can be included to aid in classification. In some embodiments, the beehive entrances may feature an automated closure mechanism controlled by the classification and control computer.

In other embodiments, a cover with a restricted entry may be used to compel insects to crawl rather than fly towards the control entry mechanism.

In yet other embodiments, physical barriers can be placed between entry ports, creating lanes that force insects to move in essentially single file.

In certain embodiments, the lane barrier may be made of highly reflective material (mirrored) and shaped to reflect both lateral views of the insect so that the overhead camera can simultaneously observe the dorsal and both lateral views.

In some embodiments, the kill mechanism may utilize a variable energy delivery mechanism under the control of the computer, adjusting the kill energy level based on the physical attributes of the insect.

In various embodiments, consistent intensity and color lighting can be integrated to aid in consistent insect classification.

In some embodiments, near-infrared LEDs operating as high-power strobes (flash) can be integrated to penetrate light hairs (fuzz) where *Varroa* mites may hide, improving *Varroa* mite detection. In certain embodiments, the classification components and kill mechanisms can be integrated into standard Langstroth beehive components.

In other embodiments, remote temperature and air composition sensors may be incorporated into the internal beehive frames. These remote sensors communicate temperature and air composition periodically to the main apparatus control computer.

In yet other embodiments, a remote temperature and air composition measurement apparatus can be used in conjunction with the main apparatus, providing increased flexibility in sensing the conditions within the hive. This remote apparatus may communicate temperature and air composition periodically to the main apparatus control computer and may also operate in standalone mode, without the main apparatus.

In various embodiments, solar panels can be used to provide energy for charging batteries that power the electronic components.

In some embodiments, controlled heating elements are implemented to reduce the wintertime energy requirements of the bee colony and enhance colony viability. Heating is controlled by monitoring both temperature and bee behavior.

In other embodiments, controlled ventilation is implemented to reduce the summertime energy requirements of the bee colony and enhance colony viability. Ventilation is controlled by monitoring both temperature and bee behavior.

In certain embodiments, a chemical sensor may be employed to detect potentially harmful substances within a hive, including viruses, bacteria, decay, and molds.

In some embodiments, the chemical sensor may be used to identify types of nectar and pollen being returned to the hive by foragers, helping beekeepers understand the current availability of flowering species near the apiary and the distances foragers travel.

In other embodiments, the visual classification sensor may be employed to identify the color and quantity of pollen being returned to the hive by foragers, further assisting beekeepers in understanding the local availability of flowering species and forager travel distances.

In various embodiments, an automated door may be added to the cover to restrict entry and increase the thermal isolation of the hive.

In some embodiments, a box alignment and stabilization device with an integrated load cell may be implemented to align and stabilize multi-box hives while monitoring hive weight.

In other embodiments, a hive leveling device may be implemented with an integrated load cell to align, level, and stabilize a hive while monitoring hive weight.

In certain embodiments, a front-facing motion detector may be implemented to detect non-insect pests such as bears, skunks, anteaters, armadillos, and other insectivorous animals that may pose a threat to an apiary. Detection may trigger visual and auditory alarms and send priority notifications to the beekeeper.

BRIEF DESCRIPTION OF THE DRAWINGS

The novel features believed characteristic of the invention are set forth in the appended claims; however, the invention itself, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
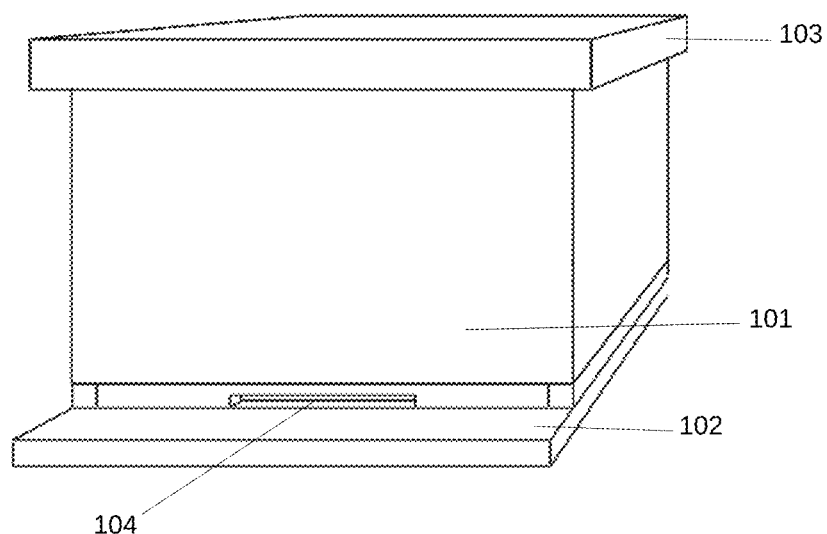
FIG. 1 is a perspective drawing of a standard Langstroth beehive box in which the present invention may be implemented.

With reference now to the figures, and in particular with reference to FIG. 1, a perspective view of a standard Langstroth beehive in which the present invention may be implemented, the beehive comprising a box 101, bottom board/landing area 102, and top 103. The landing area is the portion of the bottom board that extends in front of the box 101. The box 101 forms a strong rectangular enclosure approximately 16¼" wide×19⅞" long and 9⅝" tall. This enclosure is primarily used for laying eggs, raising larvae, and hatching larvae, and is also known as a brood box. Typically there is typically only one entrance on the bottom brood box extending across the entire front, however, it may be reduced in size to make the hive easier to defend against predatory species. The bottom board forms the floor in a beehive and shows a single restricted beehive opening 104 for bees to enter and exit the beehive.

The beehive body is typically constructed of wood and serve as the living quarters for a bee colony and sits directly on top of the bottom board 102. Hive bodies hold either eight or 10 frames (not shown) where the queen lays her eggs and workers store pollen and honey for food. Each hive body has enough space to house between 50,000 and 60,000 workers.

The beehive depicted is a single box (brood box), however in an apiary, a hive is typically constructed of one or two brood boxes and several supers (additional honey storage boxes) stacked on top. Other standard beehive components not shown, are queen excluder, honey supers, and inner cover.

Figure 2:
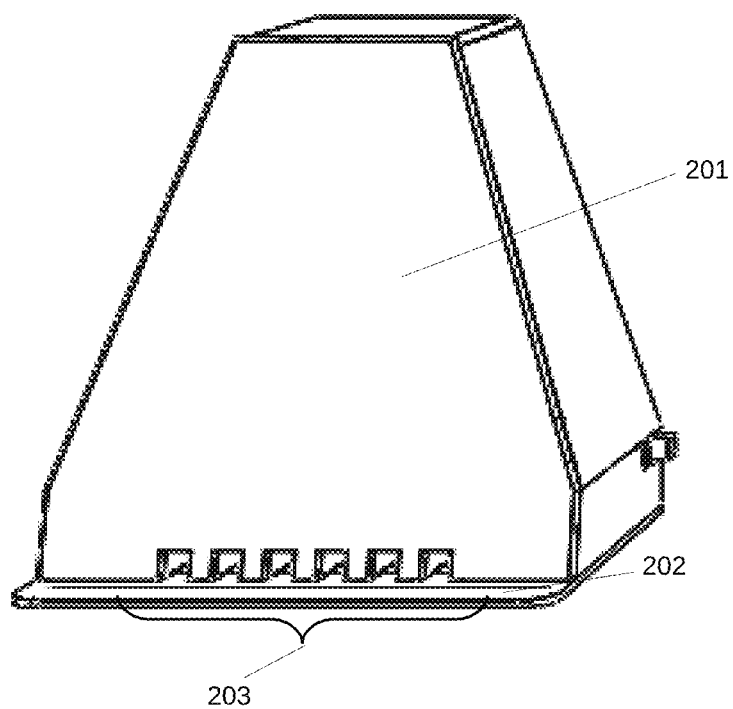
FIG. 2 is a perspective drawing of an apparatus that can be mounted on a standard Langstroth beehive in the preferred embodiment of this invention.

The beehive depicted is an example of one popular type and construction, however, the invention may be implemented on other designs as well With reference now to FIG. 2, a perspective view of an apparatus to identify and actively deny pest entry to a beehive in the preferred embodiment of this invention. The shows an apparatus body with an external cover 201, sitting on the apparatus base 202. The apparatus cover 201 has six (6) ports 203 for bee entry into the hive, however, there may be more or less ports according to the design requirements in actual practice. Each port has an separate internal kill mechanism controlled by the apparatus control computer. The depiction of six ports is for example only, the actual number implemented in products may vary as required.

Figure 3:
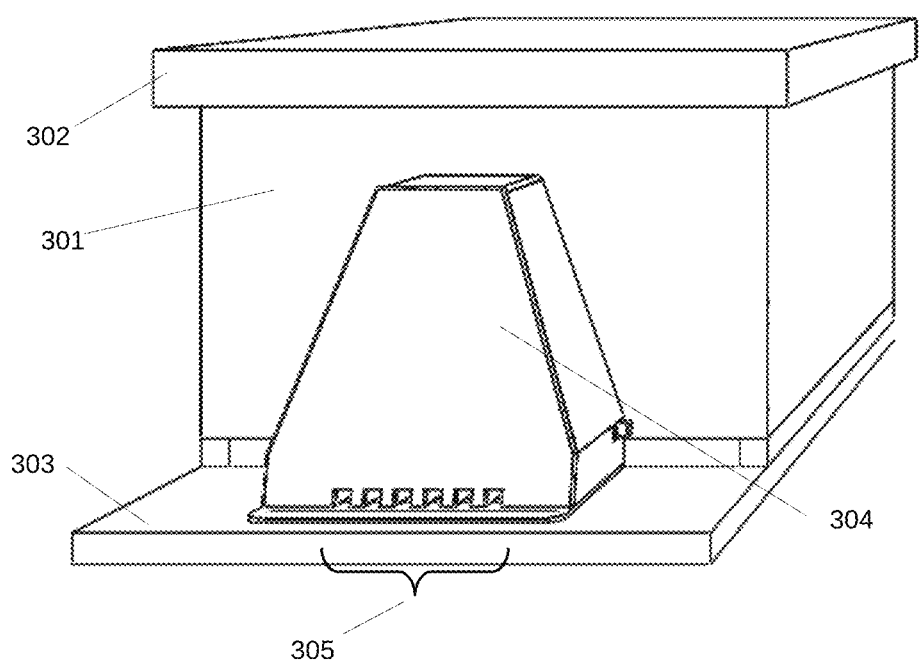
FIG. 3 is a perspective drawing of the apparatus mounted on a standard Langstroth beehive in the preferred embodiment of this invention.

With reference now to FIG. 3, a perspective view of the apparatus 304 showing mounted position on a Langstroth beehive comprising a box 301, top 302, and bottom board 303. The apparatus blocks the hive entrance (not visible) and requires all bees enter the beehive through one of the six (6) ports 305 shown. The depiction of six ports is for example only, the actual number implemented in products may vary as required.

Figure 4:
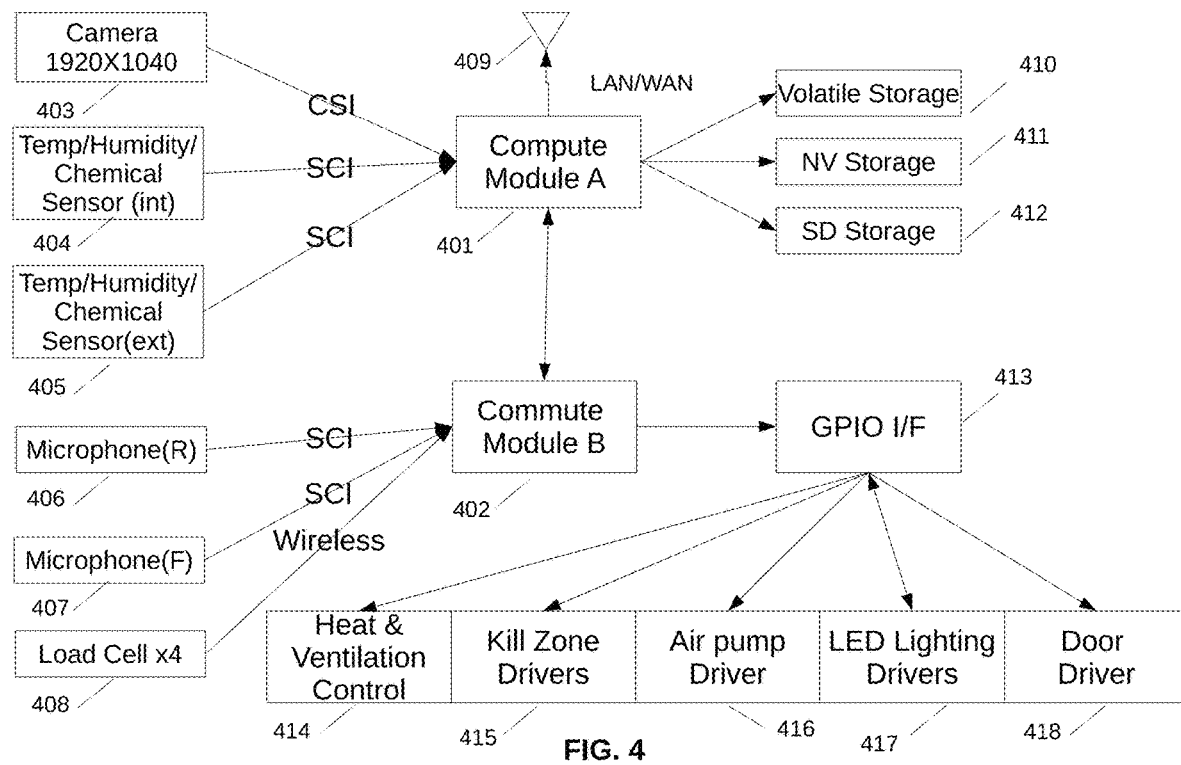
FIG. 4 is a block diagram of the functional hardware blocks of the apparatus in the preferred embodiment of this invention.

With reference now to FIG. 4, a block diagram of the functional hardware blocks of the apparatus in the preferred embodiment of this invention. Depicted are Compute Module A 401, and Compute Module B 402 which provide the primary computational resources to execute all software.

Sensor data is provided for computer analysis by the sensor system compromising a visual classification sensor 403, an internal temperature, humidity, and chemical sensor 404, an external temperature, humidity, and chemical sensor 405, a front facing audio classification sensors (s) 406, a rear facing audio classification sensor 407 and load cells 408.

The primary classification sensor is visual classification sensor 403, a high resolution auto-focus color sensor providing sub-millimeter resolution images of insects attempting to enter the beehive. The frame rate and resolution are sufficient to detect, track and classify all potential insect threats that are able to enter the entry ports as shown in FIG. 2 and FIG. 3.

The internal and external temperature, humidity, and chemical sensors 404 and 405 respectively, provide environment data for computer analysis. The temperature and humidity data are analyzed to determine if auxiliary heat or ventilation of the hive is necessary. The chemical sensor data is analyzed using artificial intelligence (AI) algorithms that have been trained to recognize chemical and biological signatures, including pathogens, rot, mildew, and fungus.

The audio classification sensors, 406 and 407 are digital microelectromechanical systems (MEMS) sensors convert sounds to electrical signals that can be analyzed to differentiate bees from flying pests such as wasps and hornets by providing high sensitivity wide-band audio data for analysis. The front facing audio classification sensor 406 provides early warning of pests that have unique audio signatures such as the Asian Giant Hornet as well as general environmental noise that may be used to detect intruders in the vicinity of the apiary. The rear facing audio classification sensor 407 data is analyzed to determine the health of the colony where both the frequency distribution and volume are used to develop a baseline and then compare current data to historical data for the hive at the same time of day and year. Deviations from the baseline are used to notify the beekeeper that a physical hive inspection may be necessary.

The load cell 408 data is used to determine the actual weight of the entire hive or the honey supers and may be monitored during the year.

A wireless interface 409 provides communication to either a central station (not shown) via LAN that allows management of multiple beehives, or via WAN that allows direct communication to the beekeeper.

Data and code are stored in local storage comprising volatile storage 410, non-volatile storage 411 and removable storage such as a Secure Digital (SD) card 412.

Physical input and output is controlled through a General Purpose Input Output (GPIO) Interface 413, coupled to apparatus control blocks comprising heat and ventilation control 414, kill zone drivers 415, air pump driver 416, LED lighting drivers 417, and door driver 418.

The heat and ventilation control 414 is used to maintain the beehive temperature and humidity within the correct levels, optimizing beehive productivity and survivability.

Kill zone drivers 415 deliver high voltage to each of the port kill mechanisms under control of algorithms executing on compute module A 401 and compute module B 402.

The air pump driver 416 controls the operation of an air pump used to extract air from the beehive for measurement by the temperature, humidity, and chemical sensors 404 and 405.

The LED lighting drivers 417, control LEDs providing interior illumination color and intensity for optimized image capture by the visual classification sensor 403. Active control is achieved using an embedded light sensor monitoring the interior light level.

The door driver 418 controls a stepper motor that opens and closes an internal door mechanism under control of algorithms executing on compute module A 401 and compute module B 402.

Figure 5:
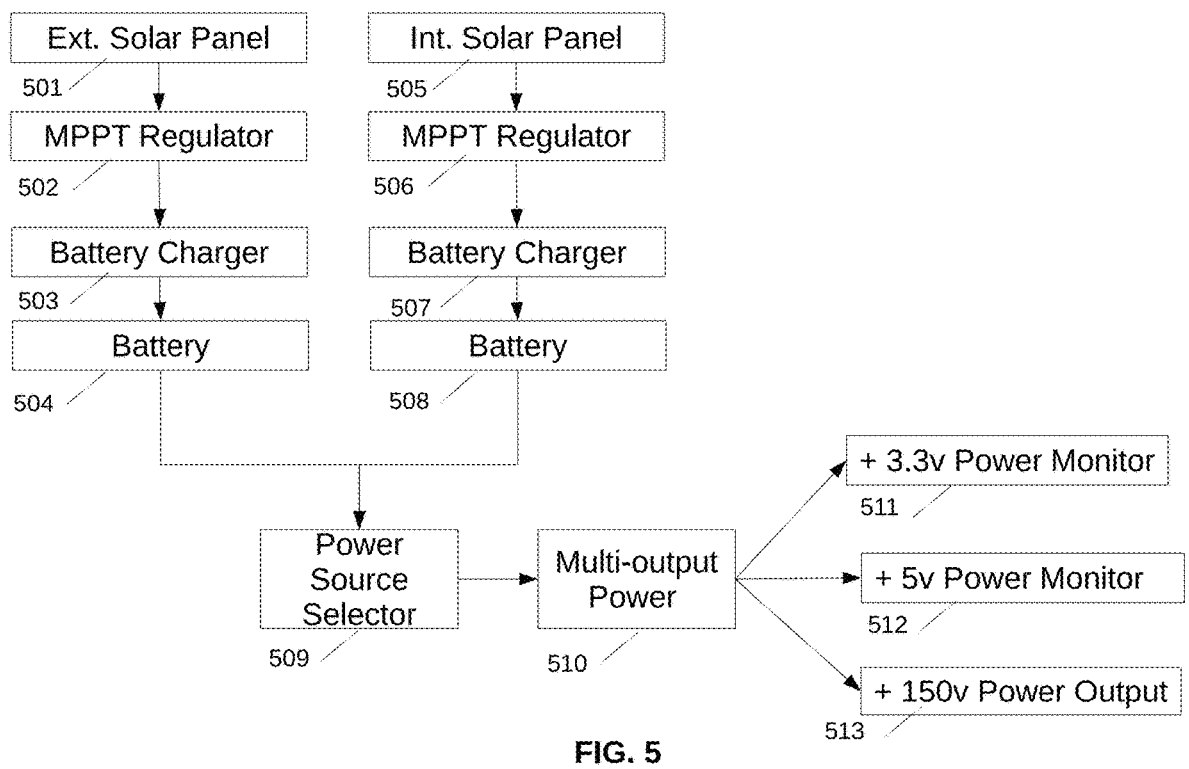
FIG. 5 is a block diagram of the power supply blocks of the apparatus in the preferred embodiment of this invention.

With reference now to FIG. 5, a block diagram of the power blocks of the apparatus in the preferred embodiment of this invention The external components are comprised of an external solar panel 501, feeding a Maximum Power Point tracking (MPPT) regulator 502, a battery charger 503 and battery 504. These components are connected by wire cable to the apparatus and provide the main operational power for the apparatus operation and sufficient battery backup for cloudy days and nigh time power demand. The internal power components are comprised of an front mounted solar panel 505, feeding a Maximum Power Point tracking (MPPT) regulator 506, a battery charger 507 and battery 508. These components are mounted on or internal to the apparatus and provide the emergency power for the apparatus operation in case of a temporary disconnect of external power.

Additionally, the power source selector 509 provided automatic switching between external and internal sources which is then fed to a multi-output power regulator 510. The multi-output regulator provides regulated 3.3V and 5.0V power that is monitored for voltage level and current usage by the respective power monitors, 511 and 512. The 150V power output 513 provided high voltage to the kill zone drivers (FIG. 4, 415).

Figure 6:
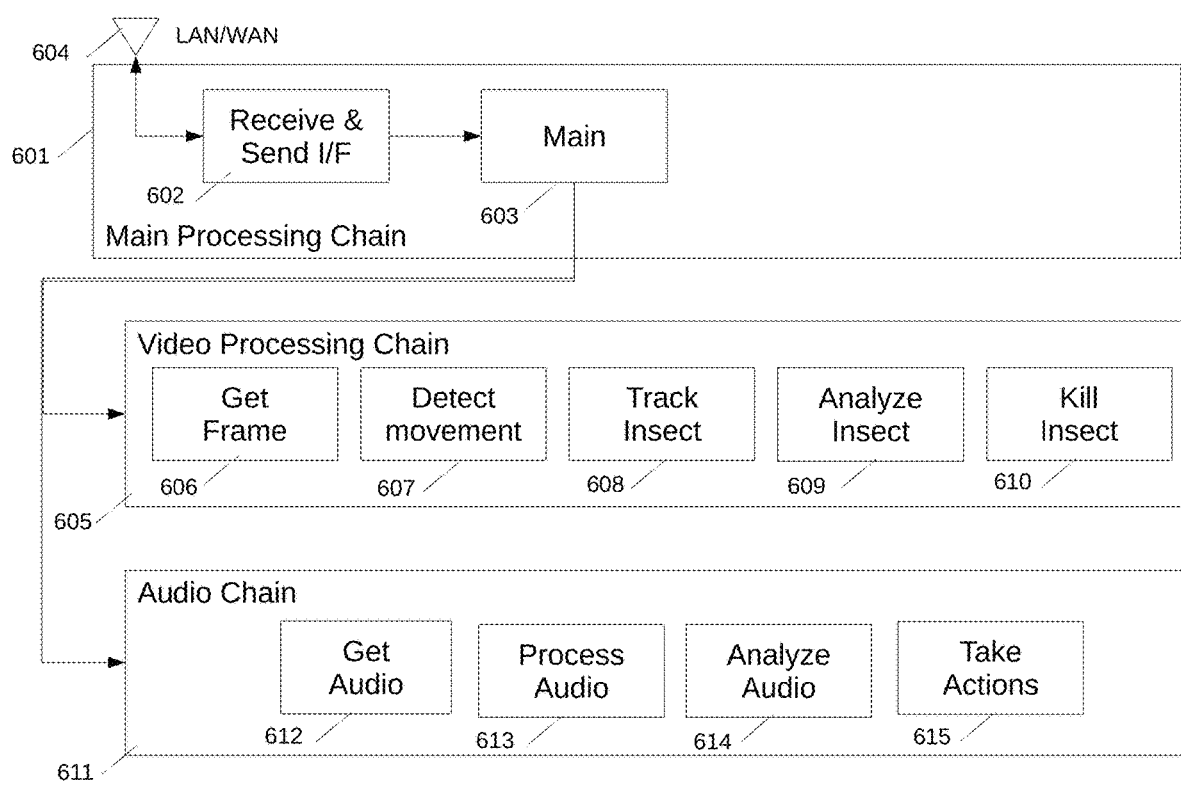
FIG. 6 is a block diagram of the primary software blocks of the apparatus in the preferred embodiment of this invention.

With reference now to FIG. 6, a block diagram of the processing blocks of the apparatus in the preferred embodiment of this invention comprised of a main processing chain 601, a video processing chain 605 and audio processing chain 611.

The main processing chain is comprised of main 603 and the send and receive interface 602. Main 603 is responsible for basic functions including boot, process startup, configuration, test, diagnostics and interface to the beekeeper via the send and receive interface 602. The receive and send interface 602 may be configured as a local area network (LAN) if a central station (not pictured) is present, or as a wide area network (WAN) if not present. The receive and send interface 602 relies on antenna 604 for signal transmission.

The video processing chain 605 is comprised of the get frame process 606, the detect movement process 607, the track insect process 608, the analyze insect 609, and the kill insect process 610. The get frame process 606 captures high speed data from the visual classification sensor hardware and loads each frame of data into memory, The detect movement process 607 compares frame to frame changes to detect movement within the visual classification sensor field of view. When movement is detected, the data is passed to the track insect process 608 which records the size, shape, and coloration of each object from frame to frame. After multiple frames of consistent data (size, shape and coloration) has been tracked, the object which represents an insect, is assigned a number and the data is passed to the analyze insect process 609 where it is characterized as a bee or not-a-bee. If the insect is characterized not-a-bee (based on size, shape and coloration), the data is passed to the kill insect process 610 which is responsible for timing the insect entry into the kill zone and applying the correct energy level to kill but not scatter the insect. If the insect is characterized as a bee, additional algorithms break the data into regions representing the dorsal and lateral views of the head, thorax, and abdominal segments of a bee. This data is then passed to algorithms to detect if *Varroa* mites are present. If the algorithm does not detect *Varroa* mites, the bee is allowed to pass through the kill zone unimpeded, however, if the algorithm detects one or more *Varroa*, actions preset by the beekeeper are initiated. Possible actions include, 1. record total number of *Varroa* mites detected and make available to beekeeper but allow bee enter the hive unimpeded,
2. record total number of *Varroa* mites attempting to enter hive, make available to beekeeper and kill bee and *Varroa* mite, and
3. simply kill bee and *Varroa* mite.

The audio chain 611 comprises the get audio process 612, the process audio process 613, the analyze audio process 614, an the take actions process 615.

Figure 7:
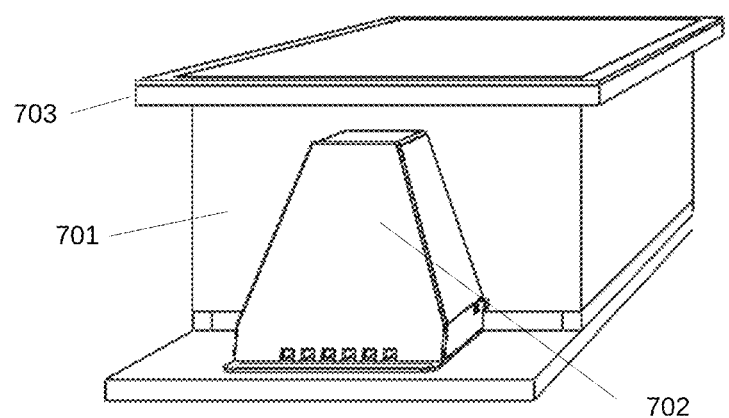
FIG. 7 is a perspective drawing of the apparatus with a solar panel mounted on a modified Langstroth beehive in the preferred embodiment of this invention.

The get audio process 612 receives a pulse-density modulated (PDM) digital signal from the front and rear MEMS Audio classification sensors via digital serial communications interface (SCI) and passed to the process audio process 613 where it is demodulated into a usable digital data stream and stored in memory. The data stream is organized into blocks and the analyze audio process 614 is called which performs special audio processing including the fast Fourier transform (FFT) which transforms the data from time to frequency domain. The resulting data is sorted into a histogram that is used to analyze the distribution. This distribution may be used to detect certain flying predatory species like the Asian Giant Hornet which have a distinctive wingbeat noise. This distribution may also be useful identifying other predators including bears, skunks, anteaters, and other insectivorous. When a specific predatory species is detected, notification is passed to the take action process 615 which follows preset instructions. Possible actions include, 1. record total number and length of detection and make available to beekeeper, and
2. close hive using automated door mechanism and notify beekeeper
3. trigger external audible and visual alarms With reference now to FIG. 7, a perspective drawing of the apparatus with a solar panel mounted on a modified Langstroth beehive 701 in the preferred embodiment of this invention. The solar panel 703 is connected via a wire connection (not shown) to an external connector on the apparatus 702.

Figure 8:
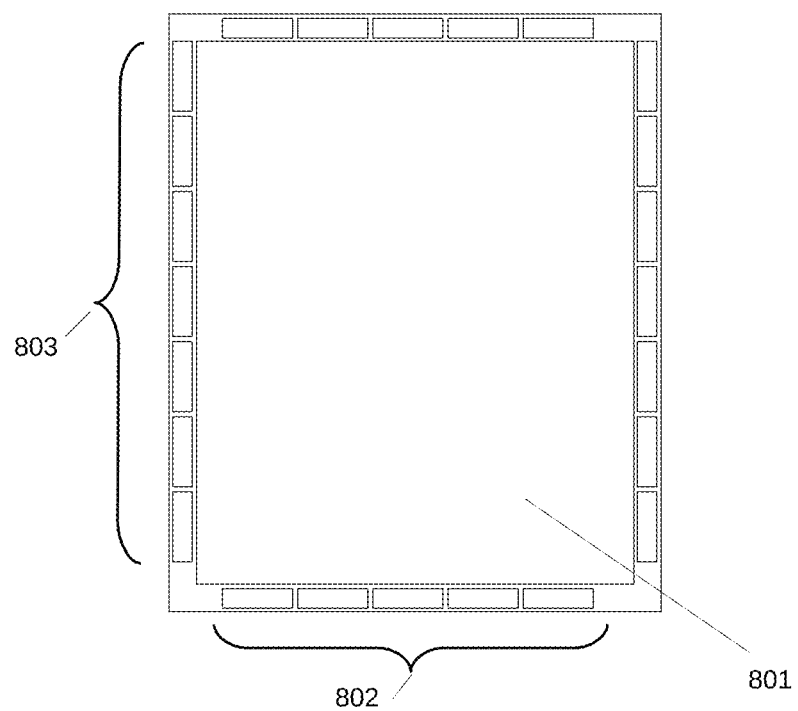
FIG. 8 is a rear view drawing of the solar panel showing the placement of batteries around the periphery in the preferred embodiment of this invention.

With reference now to FIG. 8, a rear view drawing of the solar panel 801 showing the placement of batteries 802, 803 around the periphery in the preferred embodiment of this invention. Not depicted are the required Maximum Power Point tracking (MPPT) regulator and battery charger diagrammed in FIG. 5 and detailed in the related description above.

The solar panel 801, replaces the beehive top (depicted in FIG. 1, 103), therefore measuring approximately 16"×19⅞", having an area of 0.204 $m^2$ giving about 30 watts peak power at a solar irradiance of 1000 watts/$m^2$ and efficiency of 15%. This power level establishes the maximum power available for the appliance computational resources. This configuration is adequate for southern regions having high incident solar irradiance as well as no snow or ice that can occlude the panel.

The size (in ampere-hours) of the batteries 802 and 803 depicted are design dependent, i.e., how many hours is the apparatus required to operate with minimal sunlight, what are the heating and ventilation requirements in the beehive environment.

Figure 9:
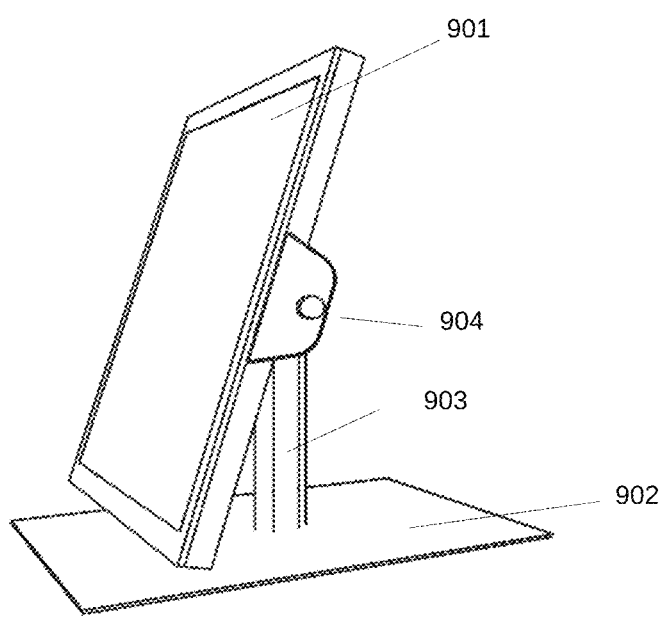
FIG. 9 is a perspective drawing of the solar panel on a tracking mount in an alternate embodiment of this invention.

With reference now to FIG. 9, a perspective drawing of the solar panel 901 (depicted in FIG. 7, 703 and FIG. 8, 801) mounted on a tracking mount comprising base plate 902, support tube 903, and pivot point 904 in an alternate embodiment of this invention. The tracking and control components are inside mounting tube 903 which protects them from the weather. In this embodiment, the batteries depicted in FIG. 8 may also be mounted inside mounting tube 903.

Figure 10:
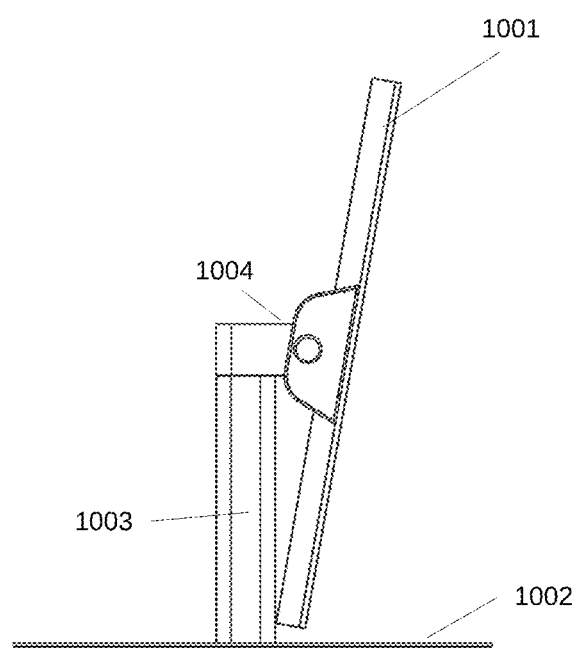
FIG. 10 is a perspective drawing of the solar panel on a tracking mount in protected mode an alternate embodiment of this invention.

With reference now to FIG. 10, a perspective drawing of the solar panel 1001 (depicted in FIG. 7, 703 and FIG. 8, 801) on a tracking mount comprising base plate 1002, support tube 1003, and pivot point 904 in an alternate embodiment of this invention. The solar panel 1001 is shown in protected mode, where the offset pivot point 1004 allows the panel assume a negative angle, thus preventing snow or ice buildup in inclement weather.

Figure 11:
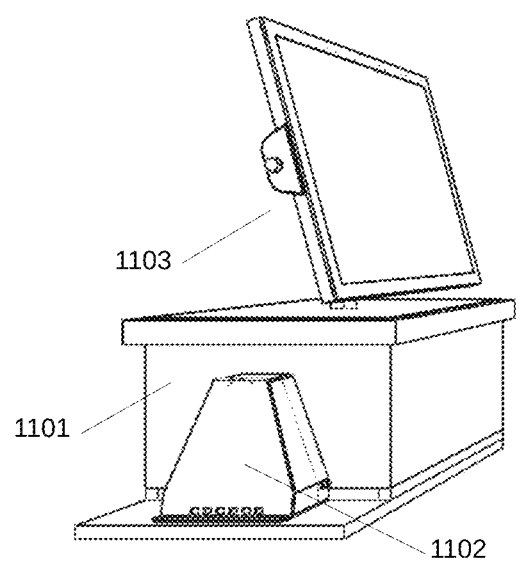
FIG. 11 is a perspective drawing of the solar panel on a tracking mount mounted on a modified Langstroth beehive in an alternate embodiment of this invention.

With reference now to FIG. 11, a perspective drawing of the solar panel 1103 mounted on a tracking mount which is mounted on a modified Langstroth beehive 1101 in an alternate embodiment of this invention.

The beehive 1101 is also shown with apparatus 1102 mounted.

Figure 12:
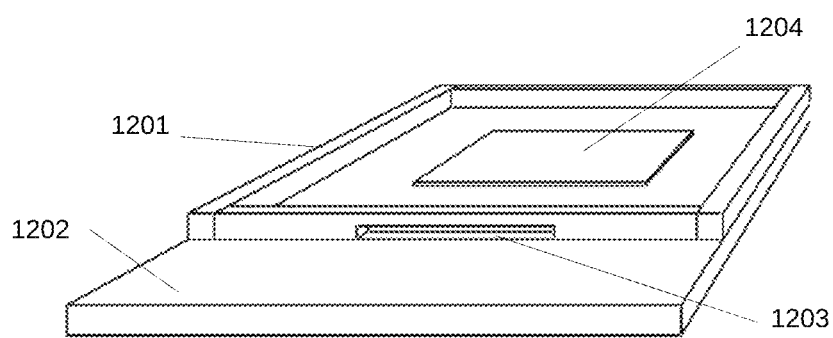
FIG. 12 is a perspective drawing of a Langstroth beehive bottom board with the position of a heating and or ventilation apparatus indicated in an alternate embodiment of this invention.

With reference now to FIG. 12 is a perspective drawing of a Langstroth beehive bottom board 1201, landing platform 1202, hive entrance 1203, and the position of a heating and or ventilation apparatus 1204 indicated in an alternate embodiment of this invention.

Figure 13:
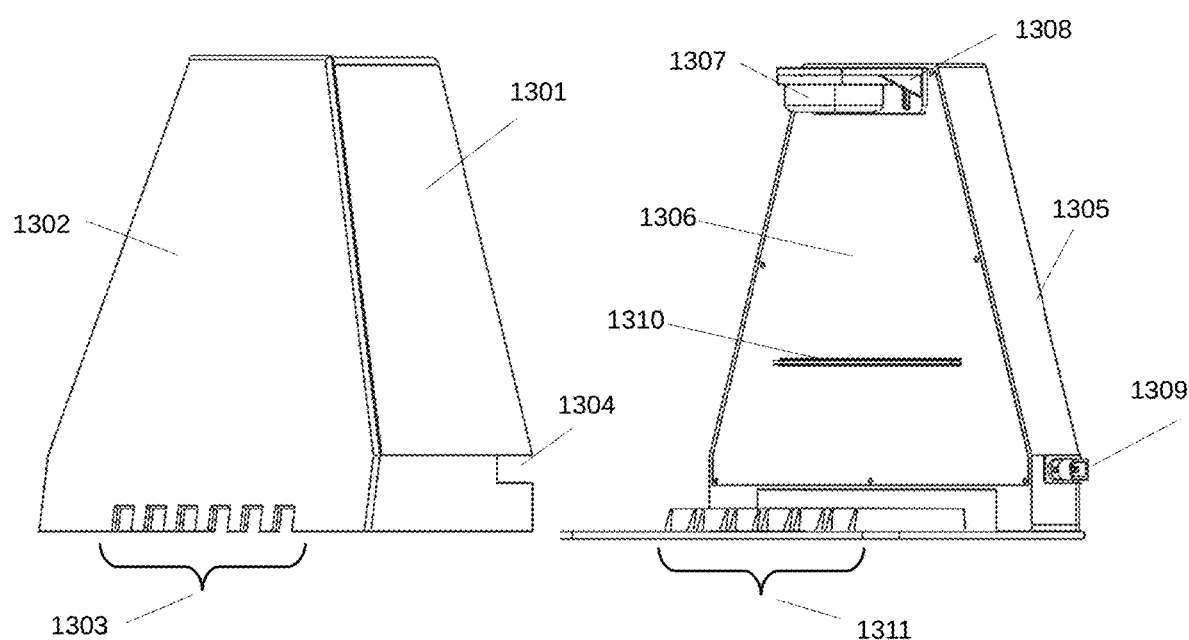
FIG. 13 is an exploded view of the apparatus showing cover and main component of the apparatus in the preferred embodiment of this invention.

With reference now to FIG. 13 is an exploded view of the apparatus in the preferred embodiment of this invention. Depicted are the outer cover 1301, front (internal) solar panel location 1302, entrance ports 1303, power connector cutout 1304 and internal components comprising back case 1305, electronics bay cover 1306, visual classification sensor 1307, visual classification sensor mount 1308, external solar panel power connector 1309, LED lighting printed circuit board (PCB) slot 1310 through the inner cover 1306, and port entrance lane structures 1311.

The outer cover 1301 prevents bees flying directly to the entrance as well as provides weather protection for all internal components. The solar panel 1302 provides charging for the internal emergency batteries that is independent of the external solar panels. The back case 1305 provides primary structural integrity and houses the electronics bay (not shown) covered by the electronics bay cover 1306. The visual classification sensor 1307 is mounted on the apparatus center line and provides high resolution video and static images to the classification software. The visual classification sensor mount 1308, which is mounted on cover 1306, provides a stable platform for the visual classification sensor 1307.

Figure 14:
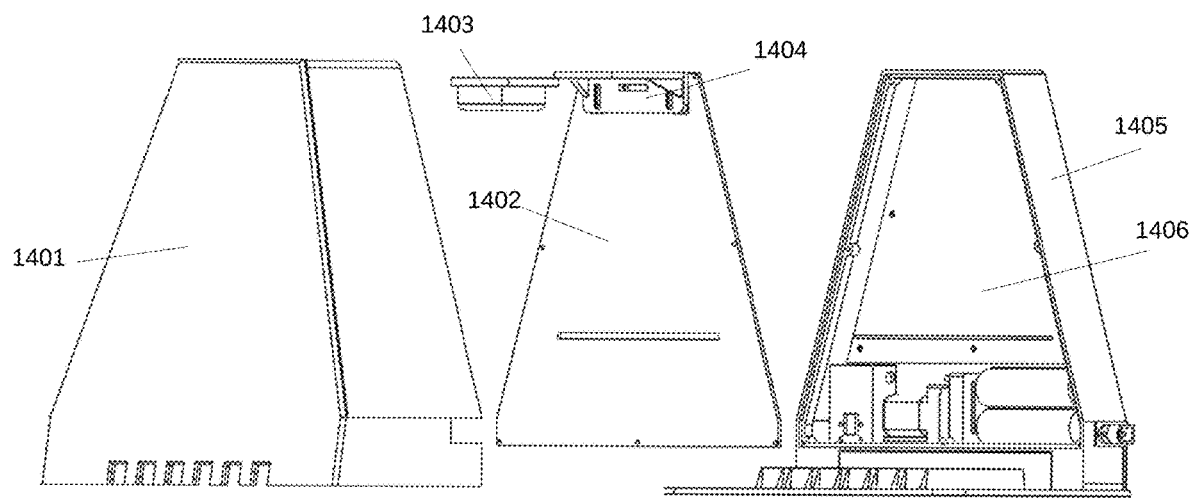
FIG. 14 is an exploded view of the apparatus showing additional component of the apparatus in the preferred embodiment of this invention.

With reference now to FIG. 14 is a further exploded view of the apparatus showing additional component of the apparatus in the preferred embodiment of this invention. Depicted are the outer cover 1401, electronics bay cover 1402, visual classification sensor 1403, visual classification sensor mount 1404, back case 1405, and electronics bay 1406.

Figure 15:
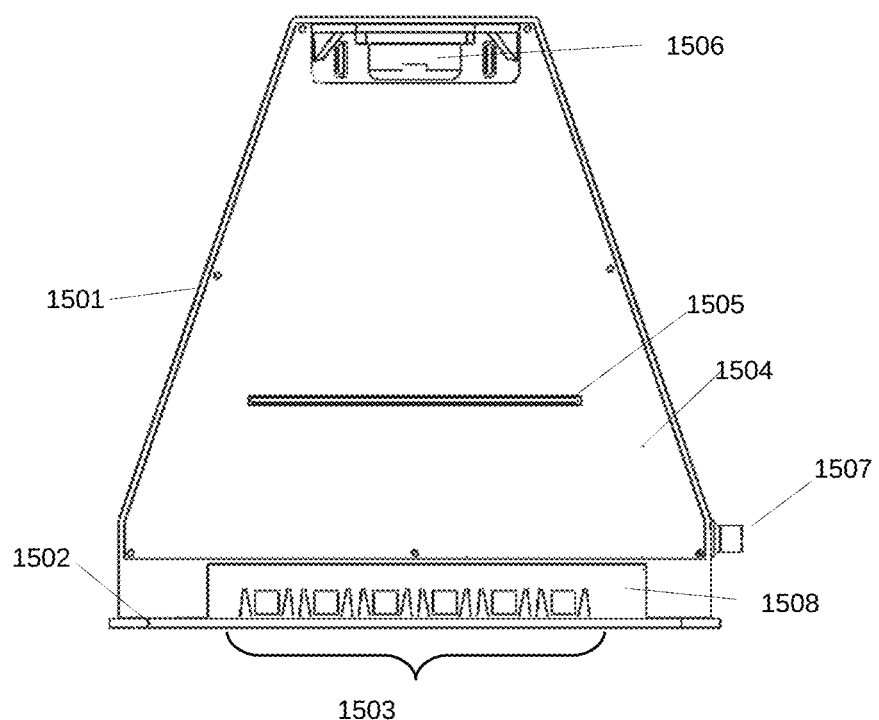
FIG. 15 is the front view of the apparatus showing the major internal components of the apparatus in the preferred embodiment of this invention.

With reference now to FIG. 15 is the front view of the apparatus showing the major internal components of the apparatus in the preferred embodiment of this invention. Depicted are back case 1501, base 1502, input port and lane structure 1503, electronics bay cover 1504, lighting board PCB slot 1505, visual classification sensor 1506, power connector 1507, and port entrance bar 1508. The lighting board PCB (not shown) extends through slot 1505 to provide uniform intensity and color distribution of the input port and lane structure 1503 for consistent insect classification, avoiding outside ambient light changes that may impair consistent classification.

Figure 16:
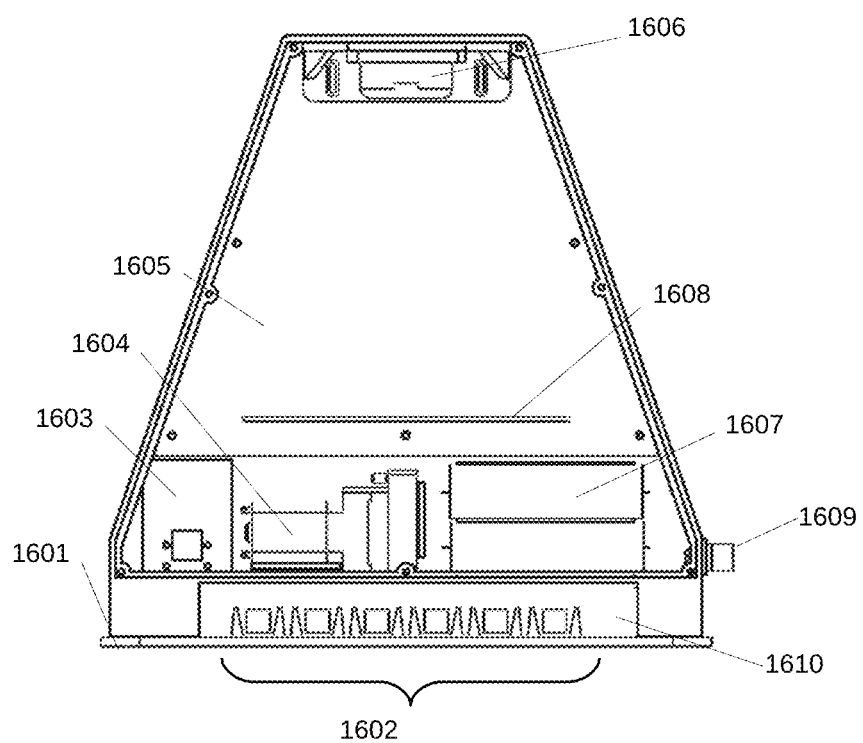
FIG. 16 is the front view of the apparatus with inner cover removed, showing the primary electronic components of the apparatus in the preferred embodiment of this invention.

With reference now to FIG. 16 is the front view of the apparatus showing the components outside of the electronics bay and the electronics bay with inner cover removed, showing the primary electronic components of the apparatus in the preferred embodiment of this invention. Depicted are the outside components comprising apparatus base 1601, input port and lane structure 1602, visual classification sensor and mount 1606, power connector 1609 and entrance port bar 1610. Components within the electronics bay comprise the main PCB 1605, chemical sensor sample chamber 1603, air pump 1604, emergency battery mounts 1607, and LED lighting board PCB 1608.

LED lighting board PCB 1608 mounts on the main PCB 1505 at a right angle to extend through the electronics bay cover (not shown) and includes both LED illumination and light level sensor. The light level sensor is monitored by the control computer and is used to set the light level, ensuring uniform intensity of the input port and lane structure 1602 for consistent insect classification.

Under control of the control computer, the air pump 1604 extracts air from the beehive, first passing through the chemical sensor sample chamber 1603, before entering the pump to avoid contamination. Outputs from the chemical sensor (not shown) are transmit to the control computer via SCI and fed to specialized AI algorithms that have been trained to recognize specific chemical signatures. These chemical signatures may include: American foulbrood (*Paenibacillus larvae=Bacillus larvae*), European foulbrood (*Melissococcus pluton*), Chalkbrood (*Ascophaera apis*), Sacbrood, fungus, and other bacteria, all of which emit specific, distinct odors.

The chemical sensor may also be trained to recognize the fragrance that the flowers impart to the nectar and pollen collected by foraging bees, aiding the beekeeper better manage the apiary.

Additionally, the sensor may be trained to recognize the odors imparted by other chemicals the foraging be comes in contact, including insecticides, herbicides and pesticides.

After testing, air pump 1604 reverses and floods the chemical sensor sample chamber 1603 with clean air for a specified time to ensure contamination is minimized.

Figure 17:
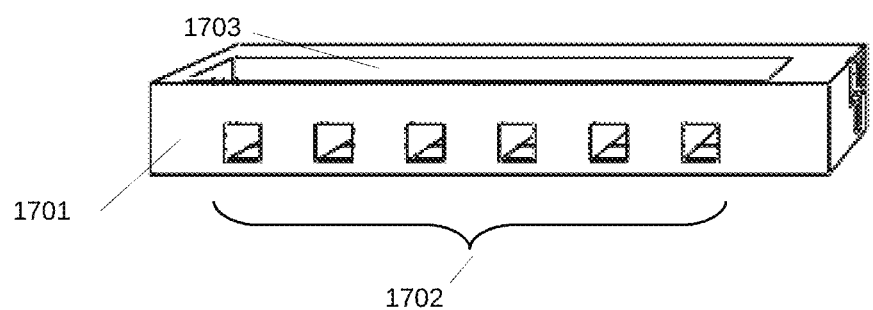
FIG. 17 is a perspective view of the port entrance bar showing the ports which must be used to entered the beehive in the preferred embodiment of this invention.

With reference now to FIG. 17 is a perspective view of the port entrance bar showing the ports which must be used to entered the beehive in the preferred embodiment of this invention. Depicted is the port entrance bar 1701, six (6) 8 mm×8 mm square ports running from front to rear 1702, and a top cutout 1703 for the kill mechanism PCBs. Not shown in this view is the bottom cutout for the kill mechanism bottom PCB. The depiction of six ports is for example only, the actual number implemented in products may vary as required.

Figure 18:
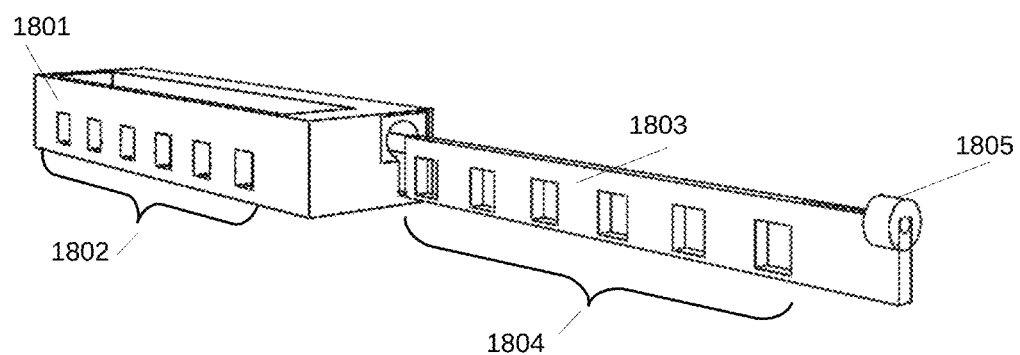
FIG. 18 is an exploded, perspective view of the port entrance bar showing the door mechanism being loaded into the entrance bar in the preferred embodiment of this invention.

With reference now to FIG. 18 is an exploded, perspective view of the entrance bar showing the door mechanism being loaded into the entrance bar in the preferred embodiment of this invention.

Depicted are the port entrance bar 1801, six (6) entrance ports, door mechanism 1803, door drive point 1805, and six (6) ports 1804. In the open position, the door ports 1804 align with the entrance bar ports 1802 and allow entry and exit from the beehive. To close the door, the control computer turns on a stepper motor (not shown) to drive the door forward into the entrance bar approximately 8 mm, which completely misaligns the the door ports 1804 and entrance ports 1802. To reopen the door, the stepper motor reverses and pulls the door approximately 8 mm, again aligning the ports. The depiction of six ports is for example only, the actual number implemented in products may vary as required.

The door drive point 1805 is threaded, or has a captured threaded insert, to translates the stepper motor's rotary motion into linear motion to drive and pull the door open and closed.

Figure 19:
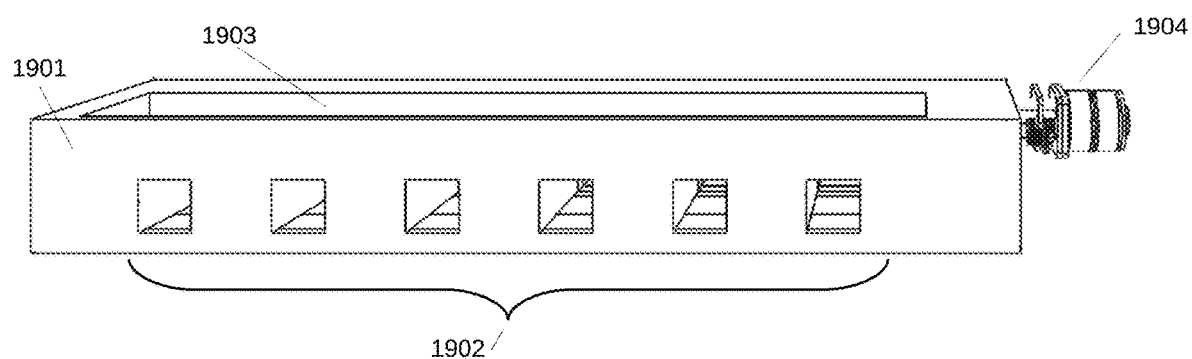
FIG. 19 is a perspective view of the port entrance bar showing the door mechanism stepper motor drive of the apparatus in the preferred embodiment of this invention.

With reference now to FIG. 19 is a perspective view of the entrance bar showing the door mechanism stepper motor drive of the apparatus in the preferred embodiment of this invention. Depicted are the port entrance bar 1901, six (6) entrance ports, top kill mechanism PCB 1903, and stepper motor 1904. The depiction of six ports is for example only, the actual number implemented in products may vary as required.

The stepper motor comprising both motor and gear box that multiplies the torque of the motor substantially. The motor is engaged periodically by the control computer, moving the door less than a millimeter back and forth, to remove any propolis buildup that may hinder door movement. Door movement is also monitored by the control computer to ensure continuous operation. The door may be closed at the beekeepers option on an automated schedule at preset times such as dusk, and reopened at dawn. The beekeeper may also command the door closed for any activities that require bees remain in hive. Additionally, the door may be automatically closed in response to certain predatory species that would otherwise decimate the colony, such as the Asian Giant Hornet, skunks, or anteaters.

Figure 20:
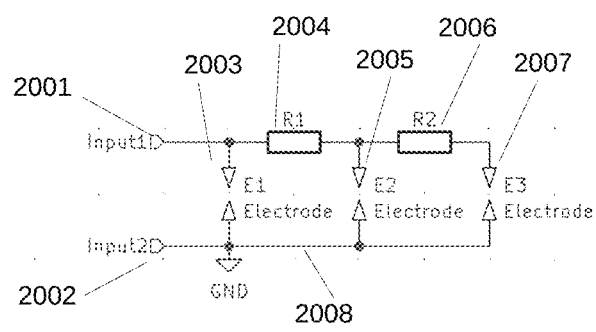
FIG. 20 is the schematic diagram of the port entrance bar bottom printed circuit board that forms part of the kill mechanism of the apparatus in the preferred embodiment of this invention.

With reference now to FIG. 20 is the schematic diagram of the entrance bar bottom printed circuit board that forms the bottom part of the kill mechanism of the apparatus in the preferred embodiment of this invention. This schematic represents one port of the six ports previously mentioned. The top part of the kill mechanism is the same and therefore this discussion applies equally. Shown are Inputs 2001, 2002, Electrode E1 2003, current limiting resistor R1 2004, Electrode E2 2005, current limiting resistor R2 2006, and Electrode E3 2007.

Prior to an insect entering the energized kill zone, the current limiting resistors 2004 and 2005 have no effect and the potential across the electrodes E1 2003, E2 2005, and E3 2007 are equal to the potential applied to inputs 2001 and 2002. An insect entering the kill zone will short electrodes E3 2007, E2 2005, and E1 2003 progressively, however, smaller insects will be killed as it shorts electrode E1 2003, where resistors 2004 and 2005 will limit the current, thereby reducing the energy available. This reduced energy will kill small insects without scattering the body parts.

Additionally, the control computer will analyze the energy necessary to kill each insect based on the insect classification and adjust the input duty cycle of the voltage applied to 2001 and 2002.

Figure 21:
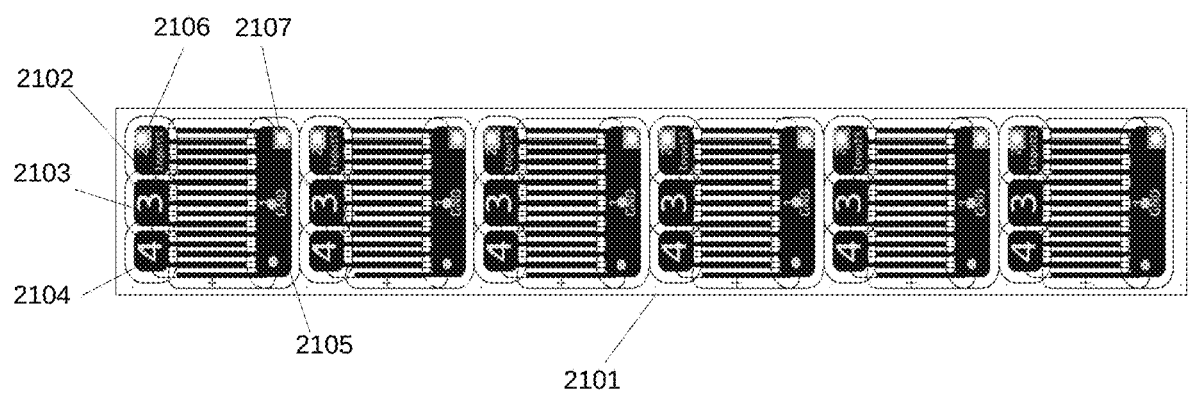
FIG. 21 is the top view of the port entrance bar bottom printed circuit board that forms part of the kill mechanism of the apparatus in the preferred embodiment of this invention.

With reference now to FIG. 21 is the top view of the entrance bar bottom PCB 2101 that forms the bottom part of the kill mechanism of the apparatus in the preferred embodiment of this invention. The top part of the kill mechanism is a mirror image and therefore this discussion applies equally.

PCB 2101 comprises six (6) identical pattern, each forming the wired parts of the circuit schematic shown in FIG. 20. Input voltage is applied to 2106 (High voltage) and 2107 (Ground), The electrodes are formed with sections 2102, 2103, and 2104, and 2105. The current limiting resistors (not shown) are soldered directly on the PCB between 2102 and 2103, and 2104.

Figure 22:
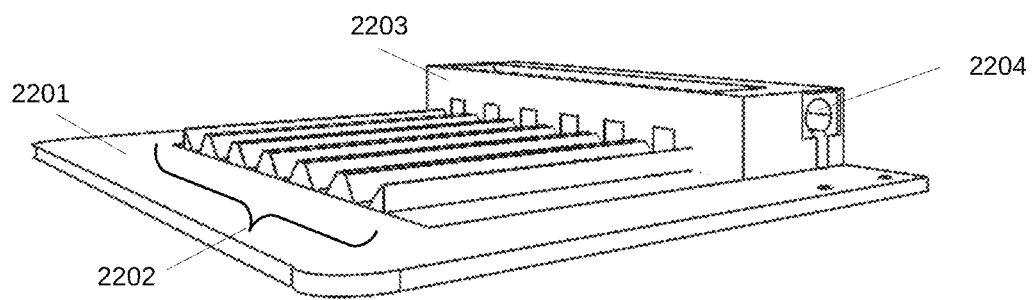
FIG. 22 is a perspective of the apparatus base with lane structures and port entrance bar of the apparatus in the preferred embodiment of this invention.

With reference now to FIG. 22 is a perspective of the apparatus base 2201 with lane structures 2202 and entrance bar 2203 of the apparatus in the preferred embodiment of this invention. Also depicted is mounting cutout for the stepper motor 2204.

The lane structure form a barrier so the insects tend to walk in a single line path into the hive.

Figure 23:
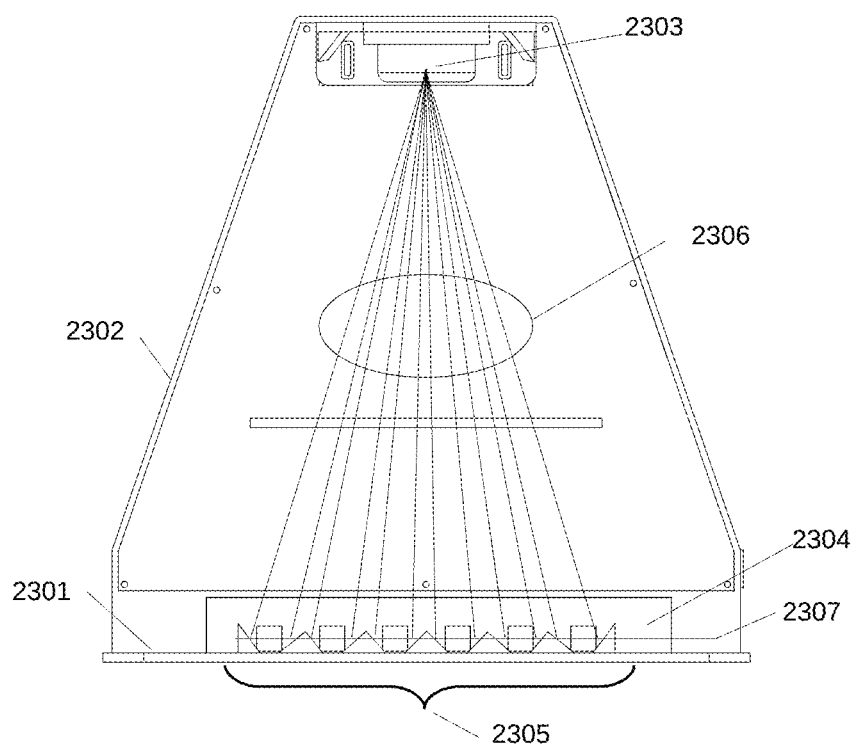
FIG. 23 is the front view of the apparatus with ray tracing shown from the visual classification sensor to the mirrored lane structures of the apparatus in the preferred embodiment of this invention.

With reference now to FIG. 23 is the front view of the apparatus with ray tracing shown from the visual classification sensor to the lane structures of the apparatus in the preferred embodiment of this invention.

In order to inspect the lateral surfaces of the insects the inside face of each of the triangular lane structures 2305 are mirrored, reflecting a view of the lateral surfaces to the visual classification sensor. Each of these surfaces is manufactured at the proper angle to view the lateral surface without distortion, optimally, this would result in each mirror being slightly curved, however, an adequate approximation is a planar mirror that is easily and inexpensively manufactured. The mirrored surfaces may be implemented by any means that produces a distortion free image of the lateral surfaces to the visual classification sensor 2303, in the preferred embodiment, thin planar glass mirrors are attached to the lane structures which are manufactured at the correct angle.

Shown in the diagram is the apparatus base 2301, the back case 2302, visual classification sensor 2303, port entrance bar 2304, entrance ports and lane structures (mirrored) 2305 and the ray traces 2306.

Figure 24:
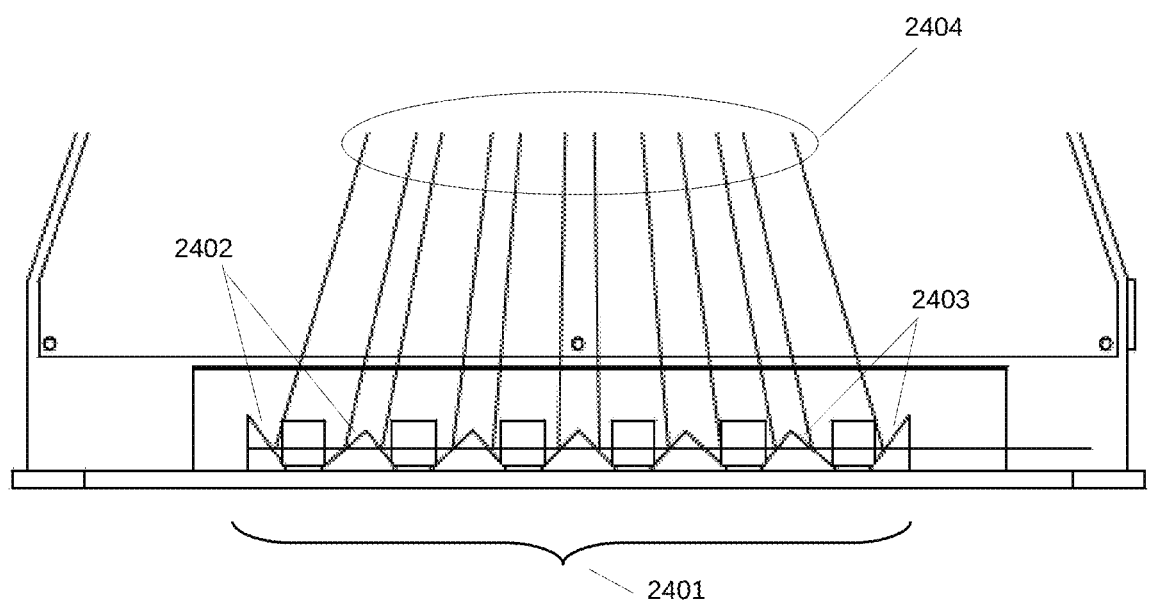
FIG. 24 is the front view of the lane portion of the apparatus with expanded ray tracing shown from the visual classification sensor to the mirrored lane structures of the apparatus in the preferred embodiment of this invention.

With reference now to FIG. 24 is the front view of the lane portion of the apparatus with expanded ray tracing shown from the visual classification sensor to the mirrored lane structures of the apparatus in the preferred embodiment of this invention. Depicted in this diagram are the six lane structures 2401, with the end structures indicating the mirrored surfaces 2402 and 2403. As depicted, all lane structures have mirrored surfaces, however, only the end surfaces are marked to avoid confusion with the ray tracing 2404.

Figure 25:
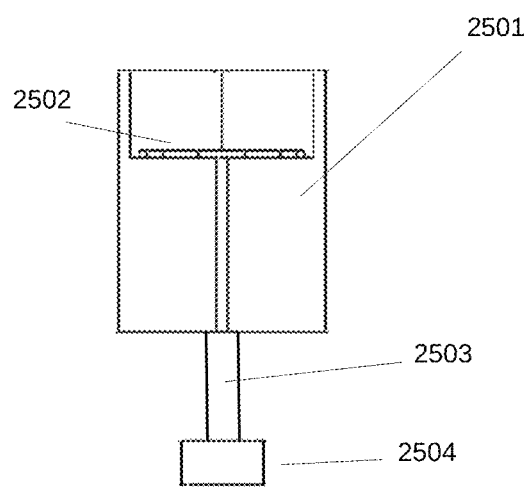
FIG. 25 is a perspective view of a leveling device with integrated load sensor that can be mounted on a standard Langstroth beehive in an alternate embodiment of this invention.

With reference now to FIG. 25 is a perspective view of a leveling device with integrated load sensor that can be mounted on a standard Langstroth beehive in an alternate embodiment of this invention. Beehives are optimally mounted in level positions, which is the purpose of the device depicted. To assist the beekeeper, it is helpful to monitor hive weight, therefore a load cell is integrated into the leveling device. The leveling device comprising a block 2501 on which the load cell 2502 is mounted, upon which the hive rests. The hive is leveled using threaded rod 2503, which sits on base 2504. The electronics package used to interface the load cell is not shown in this view.

Figure 26:
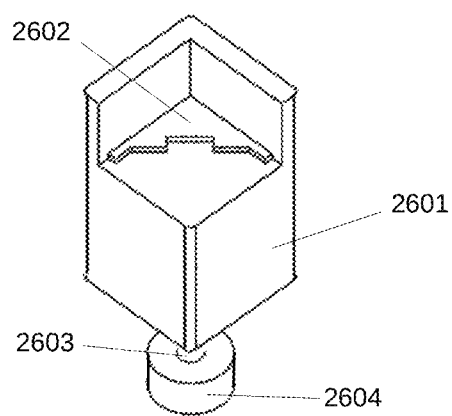
FIG. 26 is another perspective view of a leveling device with integrated load sensor that can be mounted on a standard Langstroth beehive in an alternate embodiment of this invention.

With reference now to FIG. 26 is another perspective view of a leveling device showing the leveling block 2601, with integrated load sensor 2602, that can be mounted on a standard Langstroth beehive in an alternate embodiment of this invention. Also shown is the threaded rod 2603, and base 2604.

Figure 27:
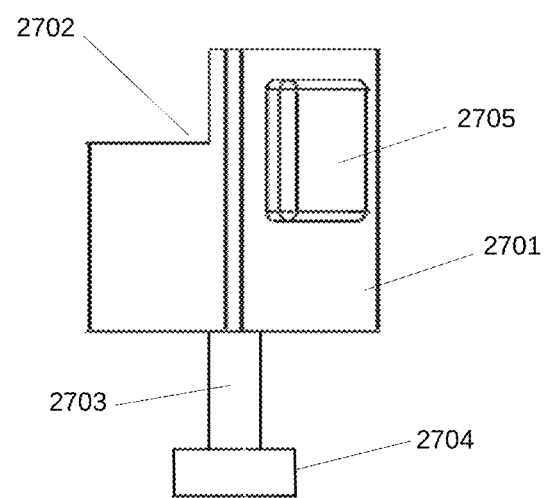
FIG. 27 is another perspective view of a leveling device with integrated load sensor showing the electronic compartment location that can be mounted on a standard Langstroth beehive in an alternate embodiment of this invention.

With reference now to FIG. 27, still another perspective view of a leveling device block 2701, with integrated load sensor 2702 showing the electronic compartment 2705 that can be mounted on a standard Langstroth beehive in an alternate embodiment of this invention. Also shown is the threaded rod 2703, and base 2704.

Figure 28:
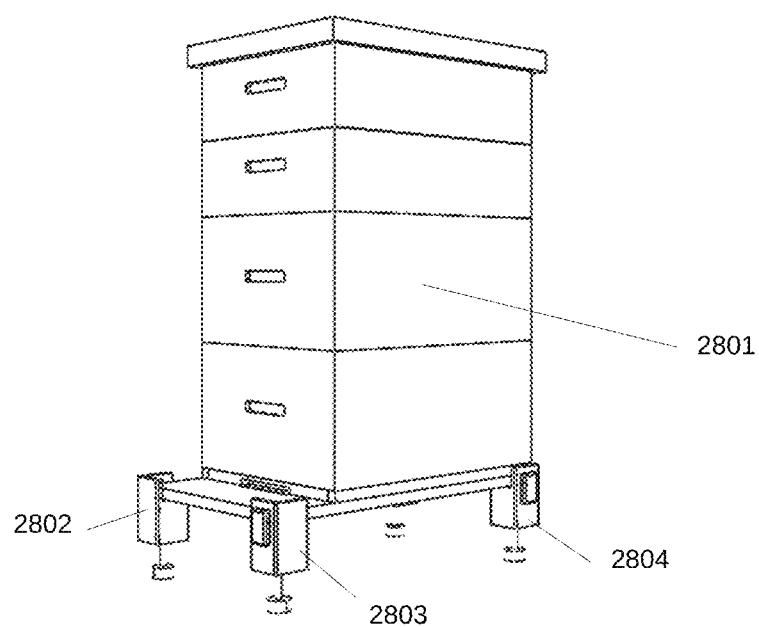
FIG. 28 is a perspective view of four leveling devices with integrated load sensors mounted on a standard Langstroth beehive in an alternate embodiment of this invention.

With reference now to FIG. 28 is a perspective view of four leveling devices with integrated load sensors mounted on a standard Langstroth beehive in an alternate embodiment of this invention. Shown in this depiction is a Langstroth beehive 2801, and leveling devices with integrated load cells 2802, 2803, and 2804.

Figure 29:
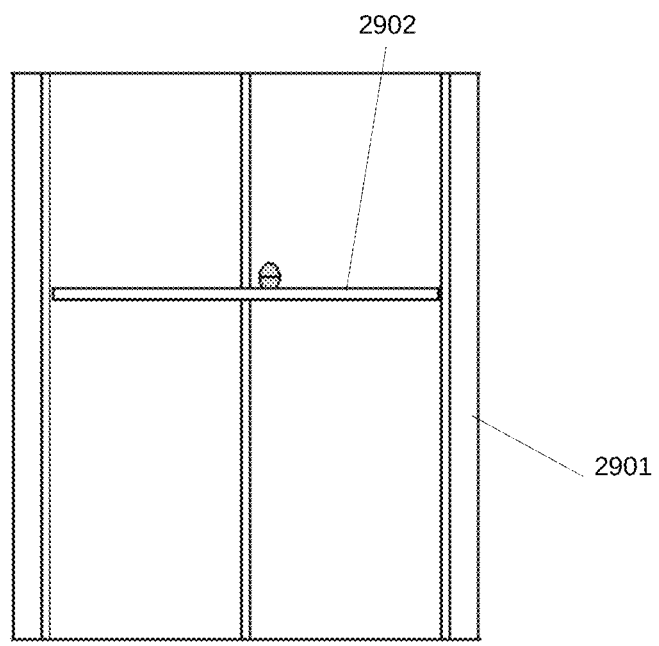
FIG. 29 is a perspective view of the inside surface of a hive stabilization device with integrated load sensor that can be mounted on a standard Langstroth beehive in an alternate embodiment of this invention.

With reference now to FIG. 29 is a perspective view of the inside surface of a hive stabilization device with integrated load sensor that can be mounted on a standard Langstroth beehive in an alternate embodiment of this invention. Shown in this depiction is the hive stabilization device 2901, and integrated load cell 2902.

Figure 30:
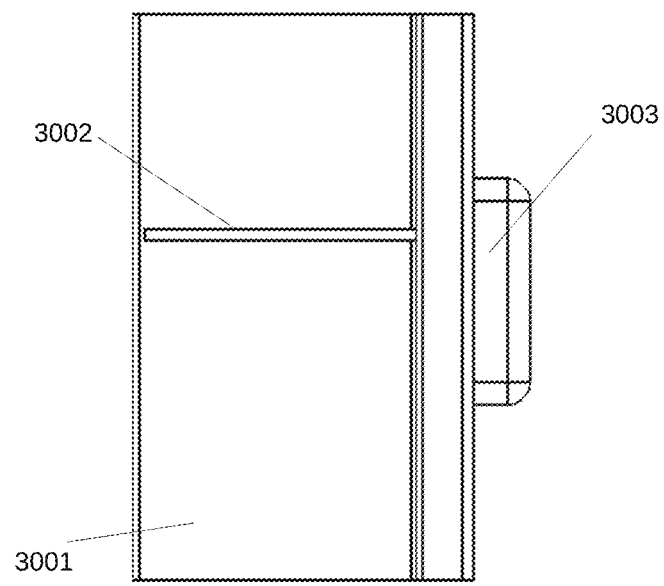
FIG. 30 is a side view of the hive stabilization device with integrated load sensor showing the electronic compartment that can be mounted on a standard Langstroth beehive in an alternate embodiment of this invention.

With reference now to FIG. 30 is a side view of the hive stabilization device 3001 with integrated load sensor 3002 showing the electronic compartment 3003 that can be mounted on a standard Langstroth beehive in an alternate embodiment of this invention.

Figure 31:
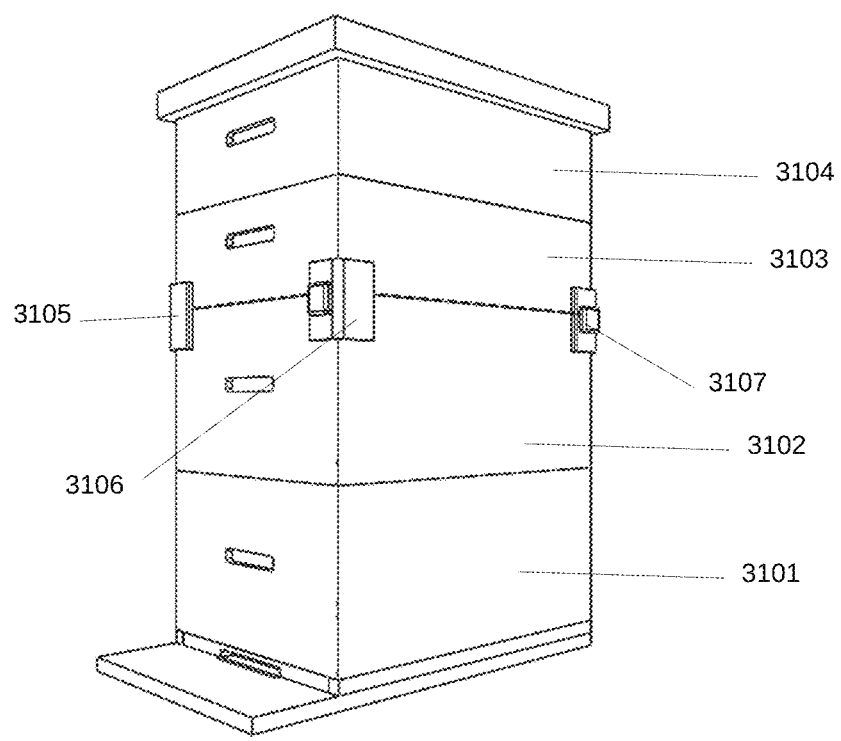
FIG. 31 is a perspective view of four stabilization devices with integrated load sensors mounted on a standard Langstroth beehive in an alternate embodiment of this invention.

With reference now to FIG. 31 is a perspective view of four stabilization devices with four (4) integrated load sensors mounted on a standard Langstroth beehive in an alternate embodiment of this invention. Shown in this depiction is a Langstroth beehive with two (2) brood boxes 3101 and 3102 and two (2) honey supers 3103 and 3104. The visible load stabilization devices 3105, 3106, and 3107 prevent the honey supers from moving relative to the brood boxes as well as provide the weight of the honey boxes, giving the beekeeper feedback on hive productivity without opening the hive.

Figure 32:
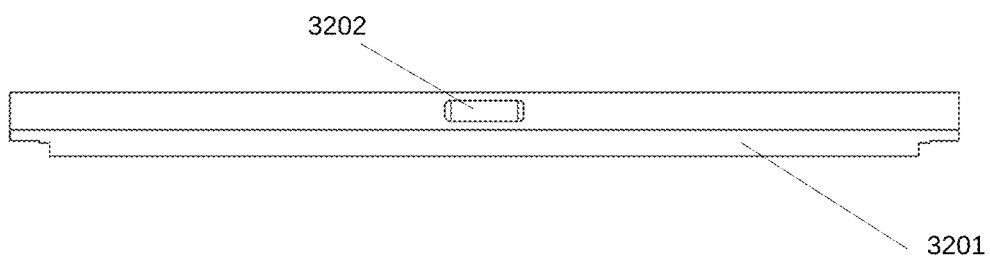
FIG. 32 is a perspective view of a modified top bar of a Langstroth beehive frame showing a slot cut for a wireless monitoring package in an alternate embodiment of this invention.

With reference now to FIG. 32, a perspective view of a modified top bar of a Langstroth beehive frame showing a slot cut for a wireless monitoring package in an alternate embodiment of this invention. Depicted in this diagram is frame top 3201, and cutout 3202 which allows a wireless monitoring device be placed in situ for maximum measurement accuracy. The monitoring device may monitor audio, temperature, pressure, humidity, $CO_2$ levels, volatile organic compounds (VOCs), volatile sulfur compounds (VSCs) or other gas or chemical compositions. The device communicates via wireless link to the apparatus described in FIG. 4, 405.

Figure 33:
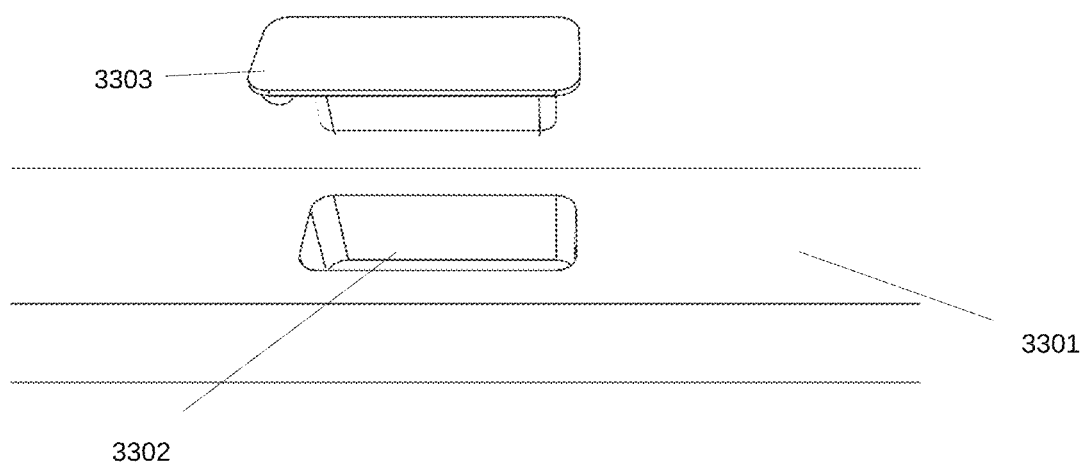
FIG. 33 is a perspective (partial) view of a modified top bar of a Langstroth beehive frame showing a wireless monitoring package and the slot cut to accommodate the package in an alternate embodiment of this invention.

With reference now to FIG. 33 is a perspective (partial) view of a modified top bar 3301 of a Langstroth beehive frame showing a wireless monitoring package 3303 and the slot cut 3302 to accommodate the package in an alternate embodiment of this invention. The monitoring device may monitor audio, temperature, pressure, humidity, $CO_2$ levels, volatile organic compounds (VOCs), volatile sulfur compounds (VSCs) or other gas or chemical compositions. The device communicates via wireless link to the apparatus described in FIG. 4, 405, or in an alternate embodiment, an additional intelligent receiver that receives the wireless signal, decodes, analyzes, stores and forwards pertinent information to the beekeeper.

Figure 34:
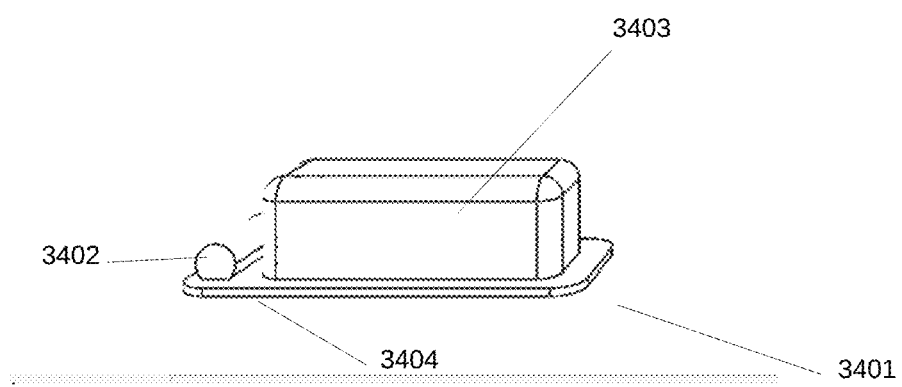
FIG. 34 is a perspective view of the bottom of the wireless monitoring package in an alternate embodiment of this invention.

With reference now to FIG. 34 is a perspective view of the bottom of the wireless monitoring package in an alternate embodiment of this invention. Depicted is monitoring device 3401, battery 3402, and battery 3402, electronic case 3403, and PCB 3404 upon which the electronic circuits are mounted. The use of metal core PCB or PCB through via(s) ensures ambient temperature is measurable inside the device.

Figure 35:
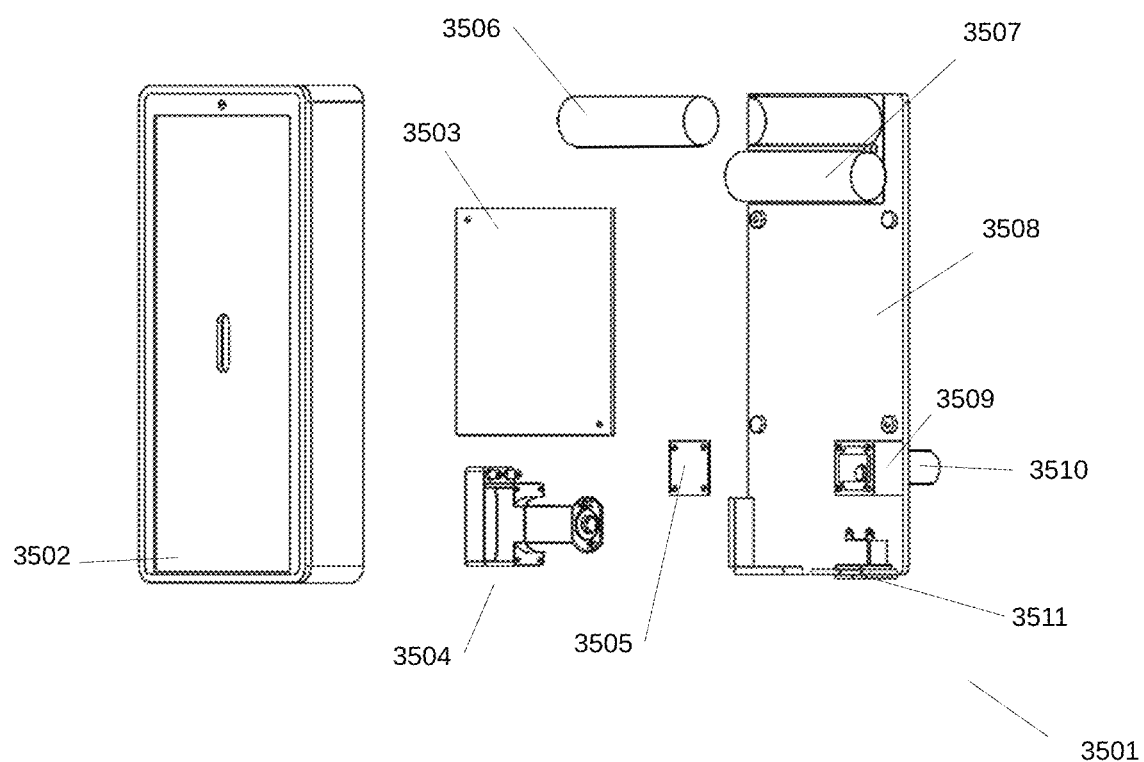
FIG. 35 is an exploded perspective view of a remote monitoring device in an alternate embodiment of this invention.

With reference now to FIG. 35 is an exploded perspective view of a remote monitoring device in an alternate embodiment of this invention. The device 3501 is intended for beekeepers needing to monitor the beehive for temperature, humidity and gas composition of a beehive. The device comprising an external cover 3502 and back 3508 which provides support for the components. Components mounted include the main PCB 3503, chemical sensor sample chamber 3509, air pump 3504, batteries 3506 and 3507. Also shown is the sample tube 3510 which is inserted through a hole in the beehive to extract air samples from the hive and chemical sensor PCB 3505. A solar panel is mounted on the front of case 3502. External power may be used via power jack 3511. The PCB houses a microcontroller and associated electronic components that provide the computational resources.

Under control of the control computer, the air pump 3504 extracts air from the beehive, first passing through the chemical sensor sample chamber 3509, before entering the pump to avoid contamination. Outputs from the chemical sensor (not shown) mounted on PCB 3505 are transmit to the control computer via SCI and fed to specialized AI algorithms that have been trained to recognize specific chemical signatures. These chemical signatures may include: American foulbrood (*Paenibacillus larvae=Bacillus larvae*), European foulbrood (*Melissococcus pluton*), Chalkbrood (*Ascophaera apis*), Sacbrood, fungus, and other bacteria, all of which emit specific, distinct odors.

The chemical sensor may also be trained to recognize the fragrance that the flowers impart to the nectar and pollen collected by foraging bees, aiding the beekeeper better manage the apiary.

Additionally, the sensor may be trained to recognize the odors imparted by other chemicals the foraging be comes in contact, including insecticides, herbicides and pesticides.

After testing, air pump 3504 reverses and floods the chemical sensor sample chamber 3509 with clean air for a specified time to ensure contamination is minimized.

As those of ordinary skill in the art will understand a source of power must be provided for all embodiments of the present invention, usually comprising a battery with a solar energy recharging.

The descriptions of the present invention has been presented for purposes of illustration and description, and is not intended to be exhaustive or limited to the invention in the form disclosed. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for identifying and actively denying pests entry to a beehive, the beehive comprising at least a brood box with an entrance for access, the system comprising:
   one or more visual classification sensors configured to collect real-time data and classify insects attempting to enter the beehive by monitoring a dorsal view of the entrance of the beehive;
   one or more audio classification sensors positioned near the brood box entrance, configured to collect real-time audio data and classify insects attempting to enter the beehive by monitoring ambient sounds for insect classification based on flight pattern sounds, wingbeat frequency, and spectral signature analysis;
   an apparatus configured to mount on a brood box of the beehive said apparatus comprising means for mounting the one or more visual classification sensors and the one or more audio classification sensors and for restricting entry to individual entry points that are monitored with the one or more visual classification sensors;
   a classification and control computer configured to process data collected by the one or more visual classification sensors and the one or more audio classification sensors using specialized classification algorithms, including traditional algorithms and machine learning-based classification models, to establish an identity of the insects in real-time based on factors including size, sound, shape, speed, coloration, and direction of movement;

a user interface for declaring a beehive species upon initialization of the classification and control computer, wherein a user selects either *Apis cerana*, or *Apis mellifera*, or another desirable honeybee species as a target beehive species, and with all other bee species being considered pests and excluded from the beehive;

a processing module for selecting a library of images and audio files typical for the declared species for positive training of the neural network, as well as a library of images and audio files of pests for negative training of a neural network-based inference algorithm specific to the selected honeybee species, wherein a pre-generated inference data set was previously generated during training using a library of images and audio files representative of the declared species for positive training, and further includes data trained using a library of images and audio files of pests, including wasps, beetles, mites, wax moths, Braula flies, spiders, earwigs, ants, cockroaches, and mite-infested bees, and wherein the inference data set may also incorporate audio files of bees under normal conditions and under stress;

one or more automated kill mechanisms positioned at each entry point of the beehive, wherein each kill mechanism, under the control of the classification and control computer, is activated only at the specific entry point where a pest is identified, ensuring that non-target insects, including bees at other entry points, remain unaffected, said one or more automated kill mechanisms being configured to prevent pest entry based on classifications determined by the classification and control computer; and a secure communication interface configured to provide authorized users with access to statistics related to insect classifications, notifications of limit conditions, and user-defined thresholds for specific insect types, the system comprising multiple communication links, including but not limited to local area networks (LAN) and wide area networks (WAN), wherein the system provides;

access to real-time and historical statistics related to insect classifications;

automated notifications of limit conditions, colony stress, or hive intrusion;

threshold settings defined by the user for specific insect types, allowing the user to customize exclusion parameters;

adaptive data transmission, wherein LAN-based communication is used when an authorized user is nearby, and WAN-based communication is utilized for remote monitoring; and integration with external databases or regulatory agencies for epizootiological tracking and regional pest monitoring.

2. The system of claim 1, wherein the one or more visual classification sensors comprise at least one device selected from the group consisting of visible light cameras, infrared cameras, LIDAR devices, and laser scanners; and wherein the system further comprises an audio sensor and a chemical sensor, each configured to generate raw data for classification of hive-related phenomena, including insect activity, environmental conditions, or the presence of hive contaminants.

3. The system of claim 1, wherein the one or more audio classification sensors comprise one or more microphones positioned within or near the beehive, configured to convert sound into electrical signals representative of frequency, amplitude, and harmonic characteristics of insect flight sounds, wherein the electrical signals are processed by the classification and control computer to differentiate honey bees from non-bee flying insect pests, including but not limited to wasps and hornets.

4. The system of claim 1, wherein the classification and control computer classifies each insect as either a member of the declared beehive species or as a pest, and logs a count of classified insects entering or exiting the beehive based on their classification.

5. The system of claim 1, wherein the one or more automated kill mechanisms are selectively triggered upon classification of an insect as a pest, to exclude the identified insect from the beehive by killing or incapacitating it, as determined by the classification and control computer.

6. The system of claim 1, wherein the user may define one or more threshold conditions for each insect type detected by the classification and control computer, wherein the system is configured to transmit a notification specifying the identified insect type and the corresponding threshold condition, enabling proactive management of invasive species or other threats to the beehive.

7. The system of claim 1, wherein the beehive entrance includes a movable barrier configured as an automated closure gate, the gate being mechanically coupled to an actuator and operable by the classification and control computer, allowing for selective opening and closing to regulate insect entry into the beehive based on classification results.

8. The system of claim 1, wherein the beehive includes a cover with a restricted entry configured to require insects to crawl rather than fly through the entry path, thereby increasing the effectiveness of the one or more automated kill mechanisms in managing pests.

9. The system of claim 1, wherein each of the one or more automated kill mechanisms includes a variable energy delivery mechanism controlled by the classification and control computer, allowing for adjustment of energy levels based on physical characteristics of the identified insect, thereby optimizing pest exclusion effectiveness.

10. The system of claim 1, further comprising a lighting system configured to provide consistent intensity and spectral output to enhance visual classification accuracy under varying ambient conditions.

11. The system of claim 1, wherein the classification and control computer and the one or more automated kill mechanisms are integrated into standard beehive components, thereby streamlining the overall hive design and reducing reliance on external equipment.

12. The system of claim 1, further comprising remote temperature and air composition sensors integrated into beehive frames, configured to periodically transmit environmental data to the classification and control computer for monitoring internal hive conditions.

13. The system of claim 1, wherein a remote temperature and air composition sensor system is operable independently from the main classification and control computer, while still communicating hive condition data for integrated monitoring and management.

14. The system of claim 1, further comprising solar panels configured to charge batteries that power the classification and sensing components of the system, thereby enabling sustainable operation of the beehive monitoring system.

15. The system of claim 1, further comprising controlled heating elements managed by the classification and control computer to optimize energy use during cold conditions based on temperature and observed bee activity, thereby enhancing colony survival.

16. The system of claim 1, further comprising controlled ventilation elements managed by the classification and control computer to optimize airflow during hot conditions based on internal temperature and bee behavior, thereby improving colony health.

17. The system of claim 1, further comprising a chemical sensor configured to detect volatile compounds associated with pathogens or hive degradation, including but not limited to decay, mold, bacteria, and virus indicators, thereby enabling early intervention for colony health management.

18. The system of claim 1, wherein the chemical sensor is further configured to identify characteristics of nectar and pollen returned by foragers, wherein the analysis is correlated with local floral species to provide insight into foraging range and bloom availability.

19. The system of claim 1, wherein the visual classification sensor is further configured to identify color and quantity of pollen loads carried by returning foragers, enabling inference of floral availability and foraging patterns.

20. The system of claim 1, further comprising an automated door integrated into a hive cover to regulate access and improve thermal insulation, thereby enhancing internal temperature control.

21. The system of claim 1, further comprising a hive box alignment and stabilization device with an integrated load cell, configured to align stacked hive boxes and monitor weight distribution and colony growth trends.

22. The system of claim 1, further comprising a base platform comprising a hive leveling device and integrated load cell, configured to stabilize the beehive on uneven ground and continuously monitor hive weight for colony assessment.

23. The system of claim 1, further comprising a front-facing motion detector configured to identify non-insect threats, including mammalian predators wherein detection triggers alarms and remote notifications to enable timely defensive action.

* * * * *